United States Patent
Lee et al.

(10) Patent No.: US 9,122,907 B2
(45) Date of Patent: Sep. 1, 2015

(54) CELL IMAGE SEGMENTATION METHOD AND A NUCLEAR-TO-CYTOPLASMIC RATIO EVALUATION METHOD USING THE SAME

(71) Applicant: NATIONAL CHENG KUNG UNIVERSITY, Tainan (TW)

(72) Inventors: Gwo Giun Lee, Tainan (TW);
Huan-Hsiang Lin, Tainan (TW);
Cheng-Shiun Tsai, Tainan (TW);
Chun-Fu Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 85 days.

(21) Appl. No.: 14/104,579

(22) Filed: Dec. 12, 2013

(65) Prior Publication Data

US 2015/0078648 A1    Mar. 19, 2015

(30) Foreign Application Priority Data

Sep. 13, 2013 (TW) .............................. 102133210 A

(51) Int. Cl.
*G06K 9/00* (2006.01)
*G06K 9/40* (2006.01)
*G06K 9/34* (2006.01)
*G06T 7/00* (2006.01)

(52) U.S. Cl.
CPC ............ *G06K 9/0014* (2013.01); *G06T 7/0012* (2013.01); *G06T 7/0091* (2013.01)

(58) Field of Classification Search
USPC .................. 382/128–134, 173–180, 254–275
See application file for complete search history.

(56) References Cited

U.S. PATENT DOCUMENTS

| | | | |
|---|---|---|---|
| 6,573,039 B1* | 6/2003 | Dunlay et al. | 435/4 |
| 6,671,624 B1* | 12/2003 | Dunlay et al. | 702/19 |
| 6,727,071 B1* | 4/2004 | Dunlay et al. | 435/7.21 |
| 7,050,620 B2* | 5/2006 | Heckman | 382/133 |
| 2002/0141631 A1* | 10/2002 | Vaisberg et al. | 382/133 |
| 2003/0059093 A1* | 3/2003 | Rosania et al. | 382/128 |
| 2003/0095721 A1* | 5/2003 | Clune et al. | 382/294 |
| 2004/0264757 A1* | 12/2004 | Bartels | 382/133 |
| 2005/0002552 A1* | 1/2005 | Dunn et al. | 382/133 |
| 2005/0009032 A1* | 1/2005 | Coleman et al. | 435/6 |
| 2005/0014217 A1* | 1/2005 | Mattheakis et al. | 435/40.5 |

(Continued)

FOREIGN PATENT DOCUMENTS

CN    101510309 A    8/2009
CN    102831607 A    12/2012

*Primary Examiner* — Alex Liew
(74) *Attorney, Agent, or Firm* — Muncy, Geissler, Olds & Lowe, P.C.

(57) ABSTRACT

A cell image segmentation method includes receiving a cell image, performing a nuclei initialization step to find an internal marker and an external marker to obtain a potential nuclei and a potential cell boundary, calculating a gradient map of the received cell image, performing a filtering step on the gradient map to generate a filtered gradient map, performing a nuclei detection step to obtain a segmented nuclei, and performing a nuclei validation step to obtain a valid nuclei. The nuclei initialization step includes performing a blob detection step to obtain a nuclei candidate, an outlier removal step to obtain the internal marker, a distance transform step to obtain a distance map, and a cell boundary initialization step to obtain the external marker. In another embodiment, a nuclear-to-cytoplasmic ratio evaluation method using the above cell image segmentation method is proposed.

11 Claims, 43 Drawing Sheets

(56) References Cited

U.S. PATENT DOCUMENTS

| | | | |
|---|---|---|---|
| 2006/0269111 A1* | 11/2006 | Stoecker et al. | 382/128 |
| 2006/0280352 A1* | 12/2006 | Muschler et al. | 382/133 |
| 2007/0025606 A1* | 2/2007 | Gholap et al. | 382/128 |
| 2008/0144895 A1* | 6/2008 | Hunter et al. | 382/128 |
| 2008/0166035 A1* | 7/2008 | Qian et al. | 382/133 |
| 2009/0290772 A1 | 11/2009 | Avinash et al. | |
| 2010/0150423 A1* | 6/2010 | Hong et al. | 382/133 |
| 2010/0172568 A1* | 7/2010 | Malon et al. | 382/133 |
| 2010/0290692 A1* | 11/2010 | Macaulay et al. | 382/133 |
| 2013/0230230 A1* | 9/2013 | Ajemba et al. | 382/133 |
| 2014/0314299 A1* | 10/2014 | Santamaria-Pang et al. | 382/133 |
| 2014/0336942 A1* | 11/2014 | Pe'er et al. | 702/19 |
| 2015/0078648 A1* | 3/2015 | Lee et al. | 382/133 |

* cited by examiner

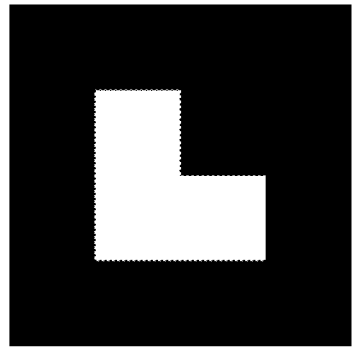
FIG. 15a
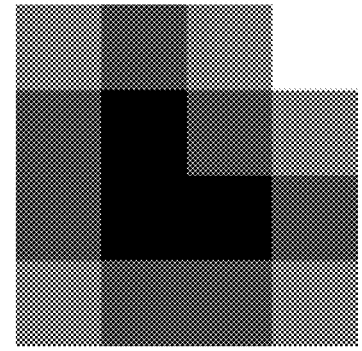
FIG. 15b
Distance transform
| 0 | 0 | 0 | 0 |
|---|---|---|---|
| 0 | 1 | 0 | 0 |
| 0 | 1 | 1 | 0 |
| 0 | 0 | 0 | 0 |
FIG. 15c
| $\sqrt{2}$ | 1 | $\sqrt{2}$ | $\sqrt{5}$ |
|---|---|---|---|
| 1 | 0 | 1 | $\sqrt{2}$ |
| 1 | 0 | 0 | 1 |
| $\sqrt{2}$ | 1 | 1 | $\sqrt{2}$ |
FIG. 15d

CELL IMAGE SEGMENTATION METHOD AND A NUCLEAR-TO-CYTOPLASMIC RATIO EVALUATION METHOD USING THE SAME

BACKGROUND OF THE INVENTION

1. Field of the Invention

The present disclosure generally relates to a cell image segmentation method and a nuclear-to-cytoplasmic ratio evaluation method using the cell image segmentation method and, more particularly, to a cell image segmentation method for cell segmentation and nuclear-to-cytoplasmic ratio analysis, as well as a nuclear-to-cytoplasmic ratio evaluation method using the same.

2. Description of the Related Art

Regarding conventional biopsy methodology and pathology examination, conventional methodology was achieved primarily through physical biopsy, which needs to remove a tissue from a living subject that is invasive, time-consuming, high-cost for preparation of abundant samples and evaluation at the microscopic level and also must be followed by complicated procedures including fixing, embedding, sectioning, and staining to determine the status of diseases. In addition to being painful to the patients, these invasive procedures may also result in risk of infection or even spreading of the cancer cells.

Optical in vivo virtual biopsy technique is successfully developed by our colleague, Ultrafast Optics Group (UFO), from National Taiwan University, which is a promising tool for noninvasive diagnosis and also can obtain in vivo section images in several skin depths. Without tissue removal, optical in vivo virtual biopsy can not only conquer the tedious stages in conventional invasive biopsy procedure, but also save time and cost for conventional pathology examination.

In order to evaluate the cell statuses, Nuclear-to-Cytoplasmic ratio (NC ratio) is a common measurement used in diagnosis and in vivo NC ratio analysis has its significance for non-invasive and immediate skin disease diagnosis. For example, the cell NC ratios of epidermis skin are in general larger as compared to those of normal cells in typical skin cancer.

FIG. 1 is conventional cell segmentation, including: (FIG. 1a) original image to be analyzed and (FIG. 1b) segmented cells. In FIG. 1a, the white areas "A" in the background represent cytoplasm, the black areas "B" surrounded by cytoplasm represent nuclei, and the enclosed lines "BND" represents cell boundaries. In FIG. 1b, the grey areas "D" represent segmented cytoplasm and the white areas "W" surrounded by segmented cytoplasm is segmented nuclei.

For conventional cell segmentation shown in FIG. 1, what it is required to do is select the nuclei and cytoplasm manually by hand selecting and then obtain the segmented nuclei and cytoplasm followed by NC ratio evaluation. It is time consuming, highly subjective, and also has inconsistent accuracy, especially for a huge mass amount of data to be analyzed.

Further conventional cell image processing methods are presented as the following:

Image thresholding is the simplest method with high-speed for image segmentation, but it has good segmentation results only for images with high contrast between objects and background. Illumination and noise are also factors to make image thresholding have undesired segmentation results even with adaptive thresholding methods. However, some biomedical images may have low contrast and contain lots of noise, which is not suitable to use image thresholding for cell segmentation.

FIG. 2 is an image segmentation of an image thresholding method, including: (FIG. 2a) input image and (FIG. 2b) result of segmentation with image thresholding of intensity. Referring to FIG. 2a, which is the input image to be analyzed, and its segmentation result with image thresholding of intensity is shown in (FIG. 2b), which has broken regions and interrupted boundary of detected objects. If the image thresholding of intensity is utilized for cell segmentation, it may not have expected results since this method does not consider the contextual information in the image and is susceptible to illumination and irregular noise which reduce the accuracy of segmentation.

Watershed transformation is one kind of image segmentation technique using the concept of morphological image processing to obtain stable segmentation results. The basic idea of watershed transformation can be considered as the phenomenon occurring on topographic surface. FIG. 3 is a topographic representation including: (FIG. 3a) two-dimensional gray-level image, and (FIG. 3b) three-dimensional topographic surface. FIG. 4 is a topographical view of the gray-level images. As shown in FIG. 3, a two-dimensional gray-level image can be considered as a three-dimensional topographic surface, that pixel values are interpreted as their altitude in the surface for watershed transformation. Three kinds of pixels including pixels at local minimum, at which a drop of water, and at which water would be equally likely to fall to more than one regional minimum are corresponding to regional minima, catchment basin, and watershed line, respectively in topographic view shown in FIG. 4.

Watershed transformation considering contextual information among pixels could be imagined that there is a hole connected with other holes by water pipe exists in each regional minimum and when the tap turned on, water from water source will flow through the pipe and then flood the surface from each regional minimum at a constant rate. The objective is to build a dam to prevent rising water spilling out from one catchment basin to another and the dam is corresponding to the segmented object. The main objective of watershed transformation is to identify the regions of regional minima with two stages. The first stage is flooding process to flood surface from regional minima and the second stage is dam construction to build barriers when two body of water from different basins meet together.

FIG. 5 is a flooding process of watershed transformation, including: (FIG. 5a) original topographic surface with four catchment basins, (FIG. 5b) topographic surface with water level is 90, (FIG. 5c) topographic surface with water level is 110, (FIG. 5d) topographic surface with water level is 130. FIG. 5 shows an example of flooding process with watershed transformation, wherein (FIG. 5a) shows original topographic surface with four catchment basins and the tap is turned on, the water level will start to rise up, and in (FIG. 5b) it can be seen that the water level is 90 and some regions are flooded, and in (FIG. 5c) water level raises to 110 and one body of water start to spill out to other one, so it needs to build a dam to prevent this thing from happening. If the water still rises, other dams should be built to prevent two distinct bodies of water meet together that shown in (FIG. 5d).

Using the above-mentioned ideas, watershed transformation often considers the gradient map and then can isolate or segment touching objects by identify the regional minima in the images. But over-segmentation problem is the main disadvantage that watershed transformation may meet since there may be some undesired regional minima or irregular noise in images and there are two main approaches to deal with the over-segmentation problem.

To solve the over-segmentation problem, the first approach to address the over-segmentation problem of watershed-based algorithm is fragment merging strategy to merge the tiny and fractional fragments of the same objects together by some merging criteria with the concept that the tiny fragments and their parent objects have the same or similar features.

The other approach to resolve the over-segmentation problem is marker-controlled strategy with assistance of marker map, including internal markers and external markers. The marker maps are the important information to direct the whole process of image segmentation to the path of obtaining segmented objects with high accuracy. The internal markers are like the seeds scattered on the whole image planes containing lots of peaks and valleys in topographic view. These seeds grow step by step with the guide of the watershed transformation to trend to gradually fit the size and shape of the objects to be segmented and with the restriction of the external markers to limit their ranges of growth and do not cross over the regions of other objects of interest.

Spectral clustering is one kind of technique for image segmentation that models the segmentation problem into the graph models as a weighted graph partitioning problem. Graph models can be built with some relations between the objects, such as similarities, distances, neighborhoods, connections, and so on. For example, vertices in the graph model can be considered as pixels in images and weighted edges connected between two vertices can be thought of as the similarity between two pixels with some criteria. Finding a cut through the graph model can be considered as finding meaningful groups of objects to resolve the problem of image segmentation and the concept of spectral clustering is also applied to cell segmentation to find meaningful objects. Although spectral clustering is a suitable approach for exploration of huge amount of data by graph modeling to reduce the complexity of the data to be analyzed, a desired graph model which can represent original data into the specific space with sparse matrix is an important topic it should be considered depending on different applications.

Deformable models which identify the boundaries of the object of interest by gradually development of contours or surfaces guided by internal and external forces are deformable curves with energy minimization to fit the image structures of interest adaptively. Several deformable models, like snake, balloon are utilized in cell segmentation. Since deformable models depend closely on several parameter settings, it may meet some difficulty to develop the algorithm for general applications. Additionally, deformable models are very sensitive to the initial condition and prior knowledge to have desirable segmentation results, which may not be possible especially for automatic cell segmentation. For example, for snake algorithm, the active contour is defined by user interactivity, which is sensitive to users intuition and initial guess that may be hard to have or decide automatically in most of applications.

Convergence index filters are local filters designed for edge or boundary enhancement in images with weak contrast and irregular noise caused by channel noise in front-end acquisition procedure, especially for biomedical images, which consider the distribution of the orientation of the gradient vectors instead of magnitude of the gradient vectors or intensity in spatial domain. The degree of convergence of the gradient vectors or called convergence index (CI) within the support region or neighborhood belonging to a pixel of interest is a measure of what degree of contribution the gradient vectors projected toward the pixel of interest. Additionally, convergence index filters own capability in adjusting the size and shape of their masks adaptively according to the distribution of the gradient vectors that make it possible to determine the boundaries of fuzzy regions in images. The following shows one of the types of filters.

Convergence index filters also called COIN filter named from acronym adopt a circle with variable radius as their support region. FIG. 6 is a support region of convergence index filter (CF). FIG. 6 shows a circle with radius r and its center is at pixel of interest P. The neighborhood of the pixel of interest P is denoted as R, which is the support region of pixel of interest P and we denote an arbitrary pixel Q whose Cartesian coordinate is (k,l) in R and θ is the angle between the gradient vector G(Q) at pixel Q and the direction of line segment $\overline{PQ}$ connecting pixel P and Q. cos θ(k,l) is used to represent the convergence index of the gradient vector G(Q) at pixel Q whose Cartesian coordinate is (k,l) that quantify the degree of contribution of this gradient vector G(Q) projected toward P.

The output of convergence index filter applying to pixel of interest P is defined as the average of the convergence indices at all pixels located in the support region R of pixel of interest P whose Cartesian coordinate is (x,y) and denoted in the following equation in 2-D discrete space, $$CF(x, y) = \frac{1}{M} \sum_{(k,l) \in R} \cos\theta(k, l),$$

where M is the number of pixels in the support region R, θ(k,l) is the angle between the gradient vector G(k,l) at pixel Q whose Cartesian coordinate is (k,l) and the direction of line segment $\overline{PQ}$ connecting pixel P and Q, and cos θ(k,l) is the convergence index of the gradient vector G(k,l) at pixel Q whose Cartesian coordinate is (k,l). The output of convergence filter locates between −1 and +1, and the maximum value of +1 happens when all gradient vectors of pixels in R point toward the pixel of interest P that means the equi-contours of intensity in R are concentric. FIG. 7 is a rounded convex region whose equi-contours of intensity are concentric, including: (FIG. 7a) a rounded convex region, and (FIG. 7b) the distribution of gradient vectors. FIG. 7a shows an example of rounded convex region whose equi-contours of intensity are concentric in 2-D space and FIG. 7b shows its distribution of gradient vectors that all gradient vectors is directed toward the center resulting in there is a maximum convergence index of +1 at the center of this rounded convex region. On the other hand, all gradient vectors of pixels in R point backward to the pixel of interest P will result in the minimum value of −1.

SUMMARY OF THE INVENTION

The objective of this disclosure is to provide an automatic computer-aided image segmentation method for cell segmentation.

Another objective of this disclosure is to obtain high efficiency, consistent accuracy and objective image segmentation results.

The further objective of this disclosure is to provide an automatic cell segmentation and NC ratio evaluation method for many fields, such as, assisting medical doctors to noninvasively identify early symptoms of diseases with abnormal NC ratios, or quantifying skin aging with cell size or assess effects of skin brightening products for cosmetics companies or medical institutions.

In an embodiment, a cell image segmentation method comprises receiving a cell image, performing a nuclei initialization step to find an internal marker and an external marker to obtain a potential nuclei and a potential cell boundary corresponding to the potential nuclei, calculating a gradient map of the received cell image, performing a filtering step on the gradient map to generate a filtered gradient map according to the potential nuclei and the potential cell boundary, performing a nuclei detection step by calculating watersheds of the filtered gradient map to obtain a segmented nuclei, and performing a nuclei validation step by preserving a part of the segmented nuclei with relatively higher compactness and excluding another part of the segmented nuclei with relatively lower compactness to obtain a valid nuclei. The nuclei initialization step comprises performing a blob detection step to obtain a nuclei candidate, performing an outlier removal step to exclude an outlier of the nuclei candidate to obtain the internal marker, performing a distance transform step of the internal marker to obtain a distance map, and performing a cell boundary initialization step to obtain the external marker from the distance map.

In the form shown, the blob detection step comprises spanning the received cell image into a scale-space to interpret a multi-scale representation of the received cell image at various scales.

In the form shown, the blob detection step further comprises a super-imposition step to calculate average scale information at various scales to obtain the nuclei candidate.

In the form shown, the distance transform step comprises calculating a Euclidean distance map of the internal marker.

In the form shown, the cell boundary initialization step comprises performing a watershed transformation of the Euclidean distance map to obtain the external marker.

In the form shown, the filtering step comprises performing a morphological minima imposition step on the gradient map according to the internal marker and the external marker.

In the form shown, the cell image segmentation method further comprises a cytoplasm initialization step to obtain a potential cytoplasmic region of the valid nuclei. The potential cytoplasmic region has a minimum boundary and a maximum boundary. The minimum boundary is a boundary of the valid nuclei. The maximum boundary is obtained from the distance map of the valid nuclei. The potential cytoplasmic region is outward of the minimum boundary and is inward of the maximum boundary. The method further comprises performing a watershed transformation on the distance map of the valid nuclei to obtain the maximum boundary.

In the form shown, the potential cytoplasmic region has a plurality of gradient vectors and a cell boundary. The cell image segmentation method further comprises a cytoplasm detection step to obtain the cell boundary using the plurality of gradient vectors.

In the form shown, the compactness of the segmented nuclei is determined by an area and a perimeter of each of the plurality of pixels in the segmented nuclei. Specifically, the compactness of the segmented nuclei is determined by an equation of $A/P^2$, wherein A represents the area and P represents the perimeter of each of the plurality of pixels in the segmented nuclei.

In another embodiment, a nuclear-to-cytoplasmic ratio evaluation method comprises performing the above cell image segmentation method, as well as obtaining a nuclear-to-cytoplasmic ratio by calculating a nucleus area and a cytoplasmic area.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 1a shows a conventional cell segmentation mechanism.

FIG. 1b shows the segmented cells of FIG. 1a.

FIG. 10a shows a gradient map of FIG. 2a.

FIG. 15a shows a 4×4 binary image.

FIG. 15b shows a distance map of the binary image.

FIG. 15c shows the pixel values of the binary image.

FIG. 15d shows the pixel values of the transformed image in FIG. 15b.

FIG. 19a shows a gradient map of FIG. 2a.

FIG. 22b shows gradient vectors of all pixels located in the block indicated in FIG. 22a.

FIG. 24a shows the segmented nuclei of FIG. 2a.

FIG. 24d shows an imposition of valid nuclei, $R_{min}$ and $R_{max}$ together on FIG. 2a.

Figures 1A, 1B:
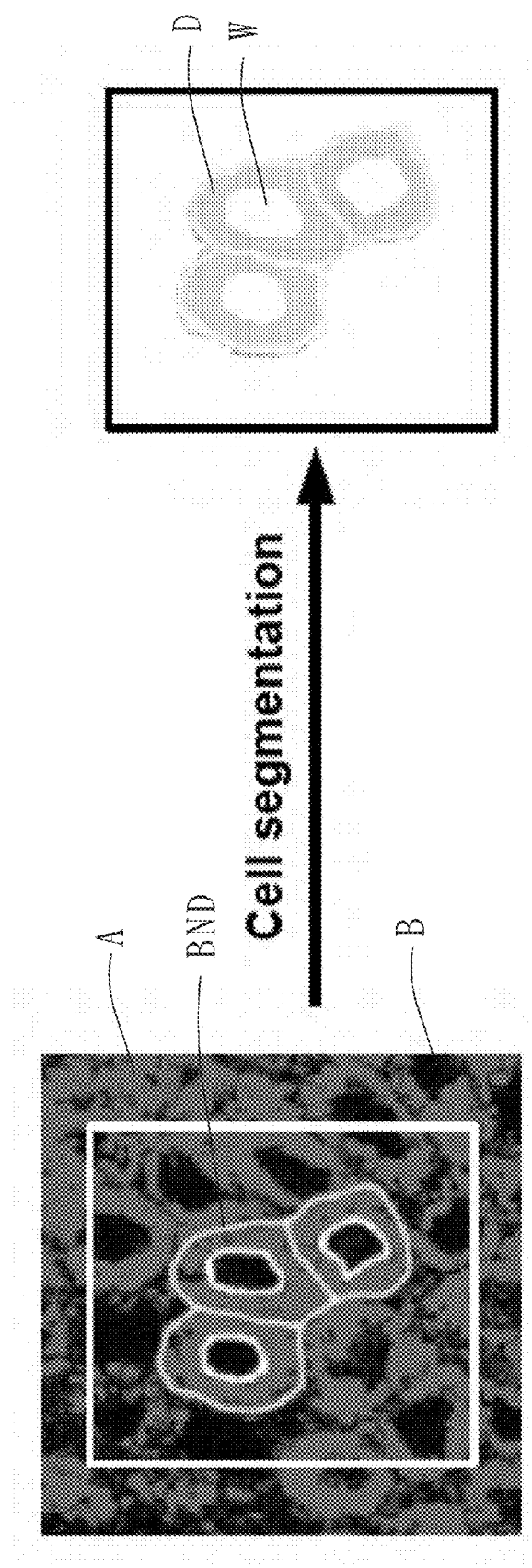

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Cell Segmentation and NC Ratio Analysis

In this disclosure, we focus on the processing and analysis procedure applied to images and image sequences with application to biomedical imaging. When observing images or image sequences, there are four basic descriptors, including shape, size, color and texture, perceived by human eyes. For making it possible to understand and analyze these basic descriptors by computers or machines, some mathematical models and their corresponding physical meanings will be understood and utilized to transform observable descriptors into informative features. For the application of Nuclear-to-Cytoplasmic ratio (NC ratio) analysis in biomedical imaging, biopsy technique is required to acquire the cells or tissues to be analyzed and cell segmentation which can isolate and select individual nucleus and its cytoplasm is then performed for NC ratio analysis. Subsequently, the evaluated NC ratios or cell information are discussed and interpreted with medical doctors to understand the status or symptoms of diseases.

Figure 8A:
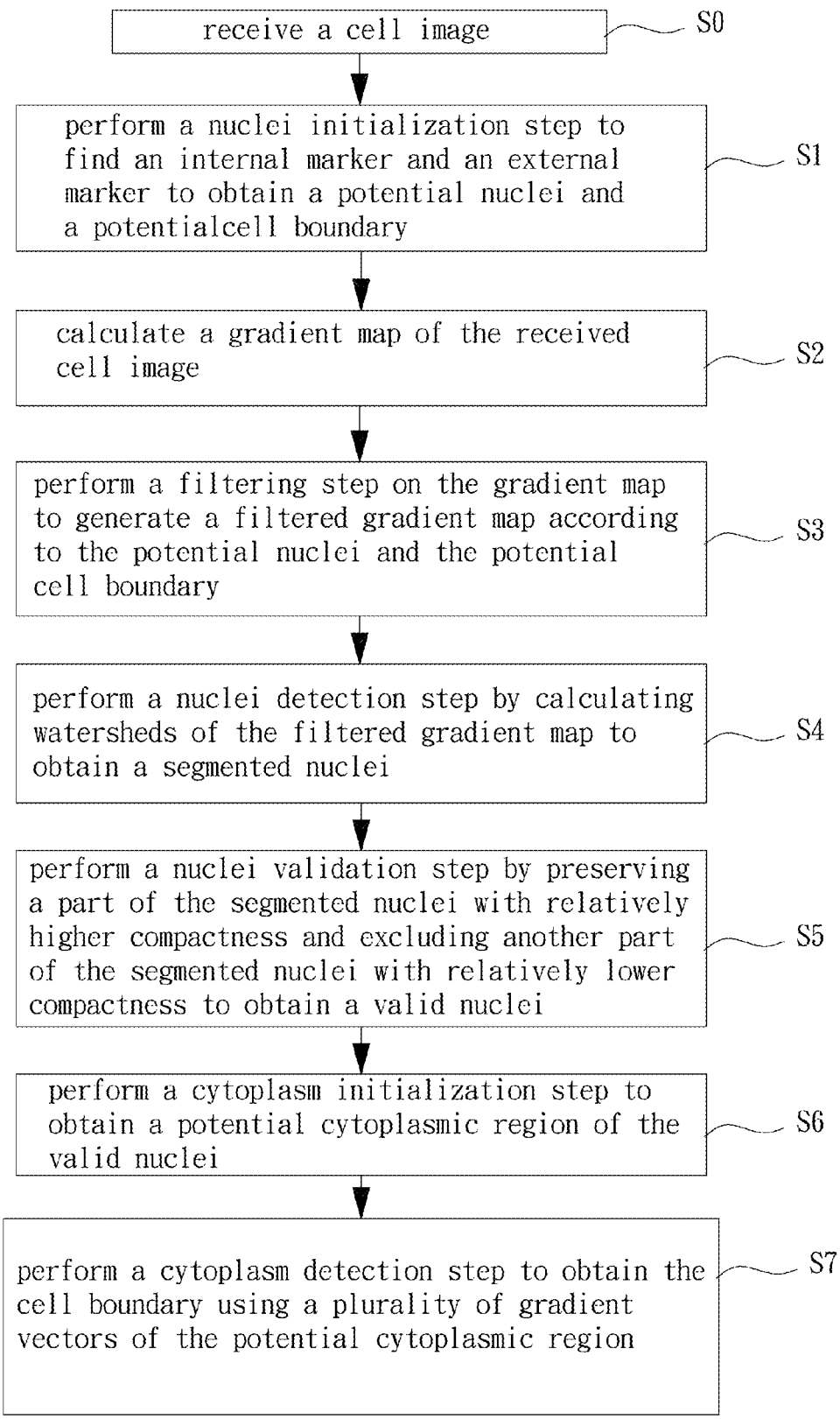
FIG. 8a shows a flowchart of a cell image segmentation method according to an embodiment of the disclosure.

FIG. 8a shows a flowchart of a cell image segmentation method according to an embodiment of the disclosure. The cell image segmentation method comprises receiving a cell image (step S0), performing a nuclei initialization step to find an internal marker and an external marker to obtain a potential nuclei and a potential cell boundary (step S1), calculating a gradient map of the received cell image (step S2), performing a filtering step on the gradient map to generate a filtered gradient map according to the potential nuclei and the potential cell boundary (step S3), performing a nuclei detection step by calculating watersheds of the filtered gradient map to obtain a segmented nuclei (step S4), performing a nuclei validation step by preserving a part of the segmented nuclei with relatively higher compactness and excluding another part of the segmented nuclei with relatively lower compactness to obtain a valid nuclei (step S5), performing a cytoplasm initialization step to obtain a potential cytoplasmic region of the valid nuclei (step S6), in which the potential cytoplasmic region has a minimum boundary and a maximum boundary, and the minimum boundary is a boundary of the valid nuclei, and the maximum boundary is obtained from the distance map of the valid nuclei, and the potential cytoplasmic region is outward of the minimum boundary and is inward of the maximum boundary. The cell image segmentation method may further comprise performing a cytoplasm detection step to obtain a cell boundary of the potential cytoplasmic region using a plurality of gradient vectors of the potential cytoplasmic region (step S7), in which the potential cytoplasmic region is concentric, and the shape of the cell and its corresponding nuclei are convex regions.

Figure 8B:
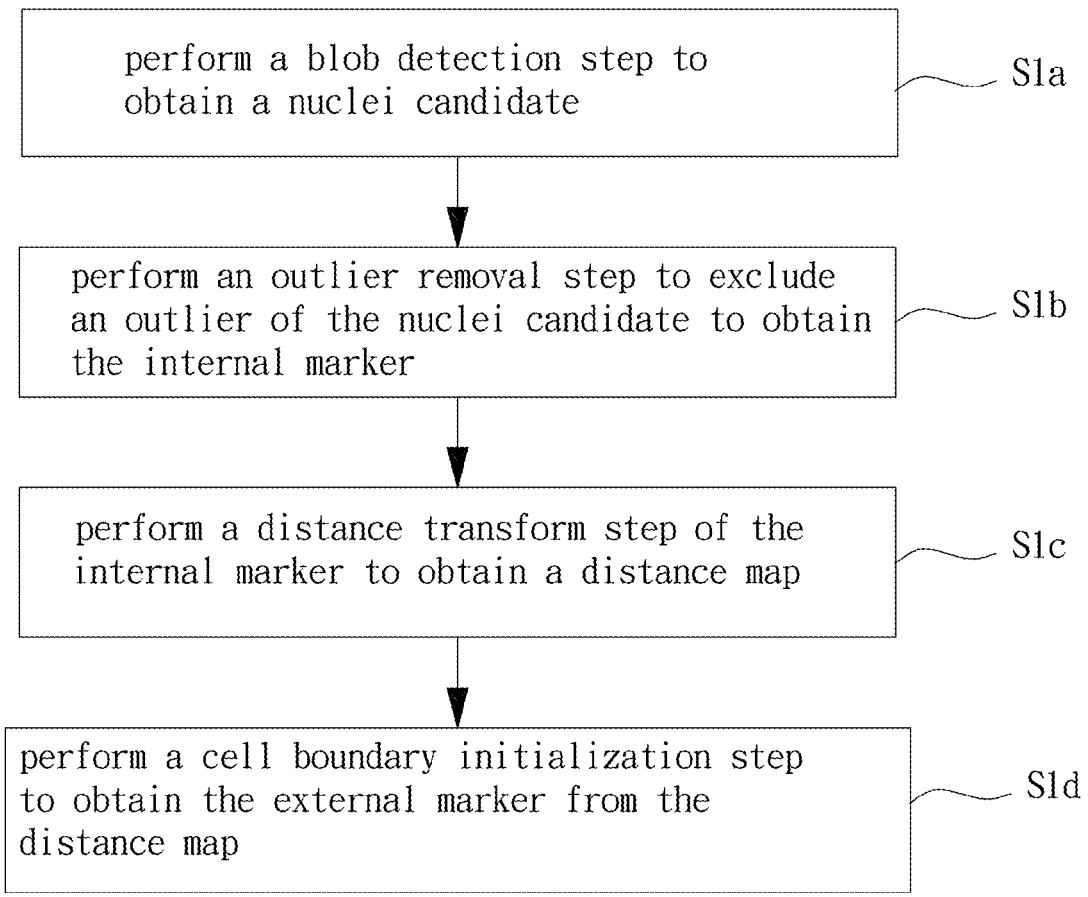
FIG. 8b shows a detailed procedure of a nuclei initialization step of the cell image segmentation method.

Referring to FIG. 8b, the nuclei initialization step in the step S1 may comprise performing a blob detection step to obtain a nuclei candidate (step S1a), performing an outlier removal step to exclude an outlier of the nuclei candidate to obtain the internal marker (step S1b), performing a distance transform step of the internal marker to obtain a distance map (step S1c) and performing a cell boundary initialization step to obtain the external marker from the distance map (step S1d). In the step S1a, the blob detection step may comprise detecting blobs with prior information of the nuclei to be segmented, and spanning the received cell image into a scale-space to interpret a multi-scale representation of the received cell image at various scales. The blob detection step may further comprise a super-imposition step to calculate average scale information at various scales to obtain the nuclei candidate. In addition, in the step S1b, the outlier removal step may comprise removing the nuclei candidate which is not surrounded completely by cytoplasm. Furthermore, in the step S1c, the distance transform step may comprise calculating a Euclidean distance map of the internal marker to obtain the distance map. Furthermore, in the step S1d, the cell boundary initialization step may comprise performing a watershed transformation on the Euclidean distance map to obtain the external marker. In the step S3, the filtering step may comprise performing a morphological minima imposition step on the gradient map according to the internal marker and the external marker.

Figure 8C:
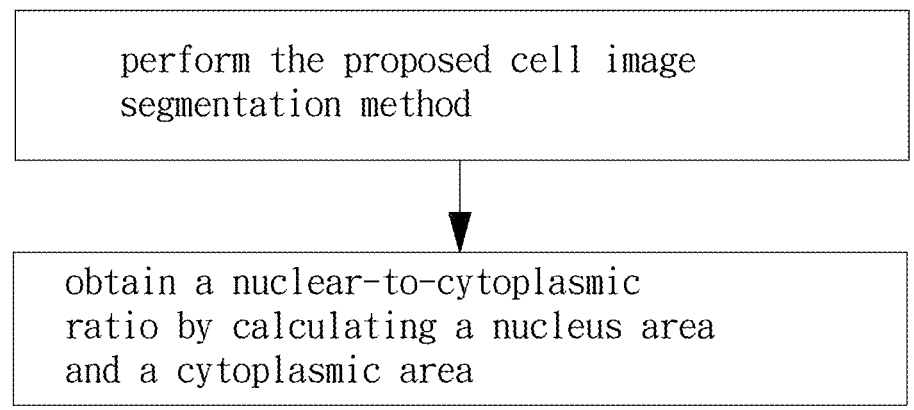
FIG. 8c shows a flowchart of a nuclear-to-cytoplasmic ratio evaluation method.

In another aspect, a nuclear-to-cytoplasmic ratio evaluation method is proposed. Referring to FIG. 8c, the nuclear-to-cytoplasmic ratio evaluation method comprises performing the above cell image segmentation method and obtaining a nuclear-to-cytoplasmic ratio by calculating a nucleus area and a cytoplasmic area.

Figure 9:
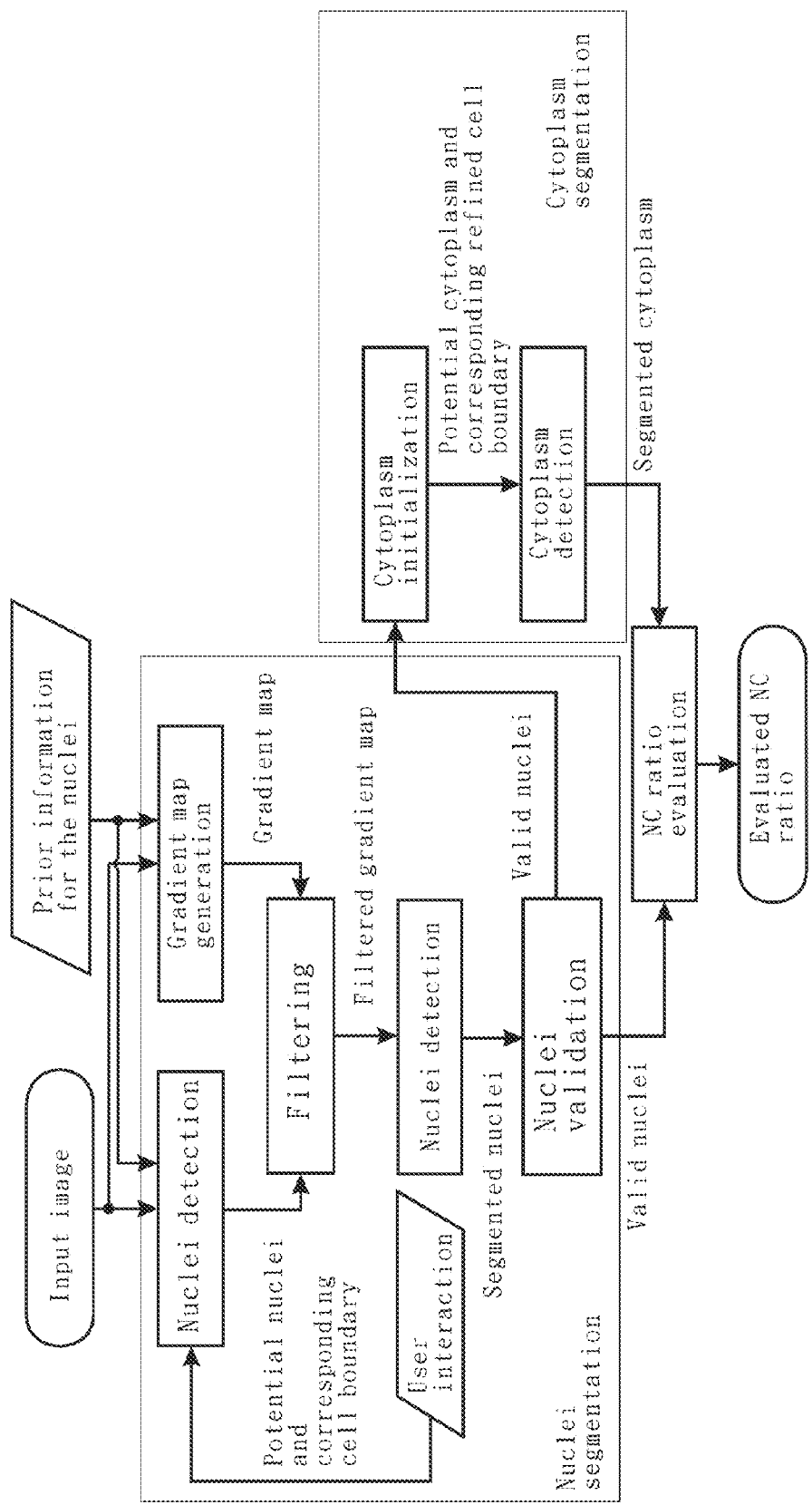
FIG. 9 shows a block diagram of cell segmentation and NC ratio analysis.

FIG. 9 is a block diagram of cell segmentation and NC ratio analysis. FIG. 9 shows the block diagram of cell segmentation and NC ratio analysis and the FIG. 9 may be divided into two parts including nuclei and cytoplasm segmentation, which are shown in the left and right boxes in FIG. 9, respectively. We use gradient watershed transformation based on the contextual information of pixels in images with marker-controlled strategy, blob detection, and consideration of shape descriptors for nuclei segmentation. The main objective of watershed transformation is to identify regional minima in original images which can be considered as the nuclei to be segmented. First, the gradient map is calculated to highlight the nuclei boundary and the homogeneous regions in the gradient map corresponding to the regional minima in the input image. But if the nuclei detection is directly performed on the gradient map, it may suffer from over-segmentation problem since there are some undesired regional minima or noise in the gradient map. To resolve the problem, nuclei initialization with marker-controlled strategy and blob detection may be performed before the stage of nuclei detection.

For nuclei initialization, potential nuclei and their corresponding cell boundary can be obtained to help to design a filter to remove the undesired regional minima and preserve the desired ones in the gradient map. Subsequently, nuclei detection using watershed transformation is performed on the filtered gradient map to obtain a segmented nuclei. Nuclei validation may also be considered using shape descriptor to exclude the outliers and preserve the valid nuclei. Of course, if the user interaction or some prior information is available in analysis procedure, the results will be improved and convinced for medical doctors' diagnosis.

For cytoplasm segmentation, cytoplasm initialization is performed based on the information of valid nuclei to obtain a potential cytoplasmic region and corresponding refined cell boundary. Then, a local filter is designed in the stage of cytoplasm detection to obtain segmented cytoplasm. Finally, the evaluated NC ratios are obtained in the stage of NC ratio evaluation.

Nuclei Segmentation

Nuclei segmentation is performed using gradient watershed transformation with marker-controlled strategy, blob detection, and consideration of shape descriptors to obtain accurate segmented nuclei. Nuclei segmentation is a crucial stage in the proposed cell segmentation algorithm since the following cytoplasm segmentation will desire to reference valid nuclei which can be thought of as initial condition of the optimization problem of whole cell segmentation to guide the algorithm to find the feasible solution with high performance.

Watershed Transformation with Marker-Controlled Strategy

Watershed transformation described in BACKGROUND OF THE INVENTION which considers contextual information in image and expects to identify the regional minima is chosen for nuclei segmentation. As the observation of images, nuclei with lower intensity locate in regional minima of images, which are highly correlated with homogeneous regions in the gradient map. So the gradient map with prior information is utilized for the boundaries of nuclei to help to extract and analyze the almost uniform and round nuclei of touching cell from the background.

Figure 10A:
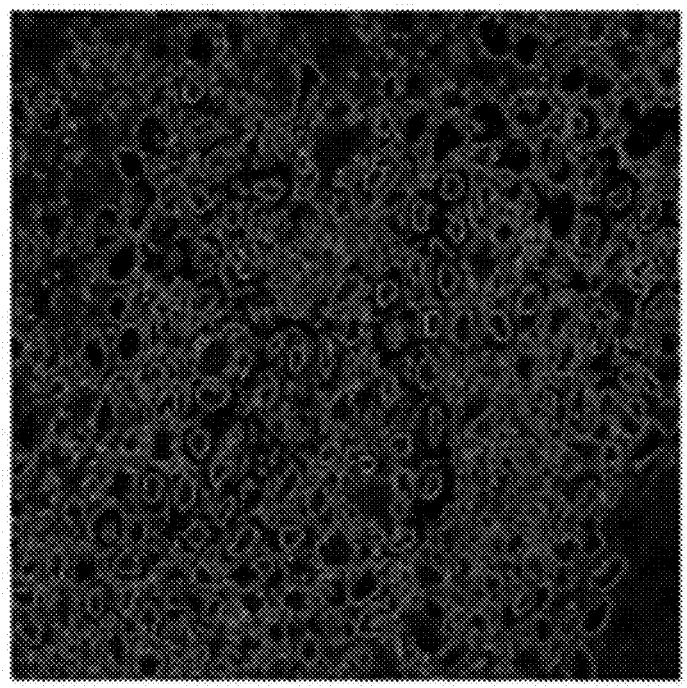
Figure 10B:
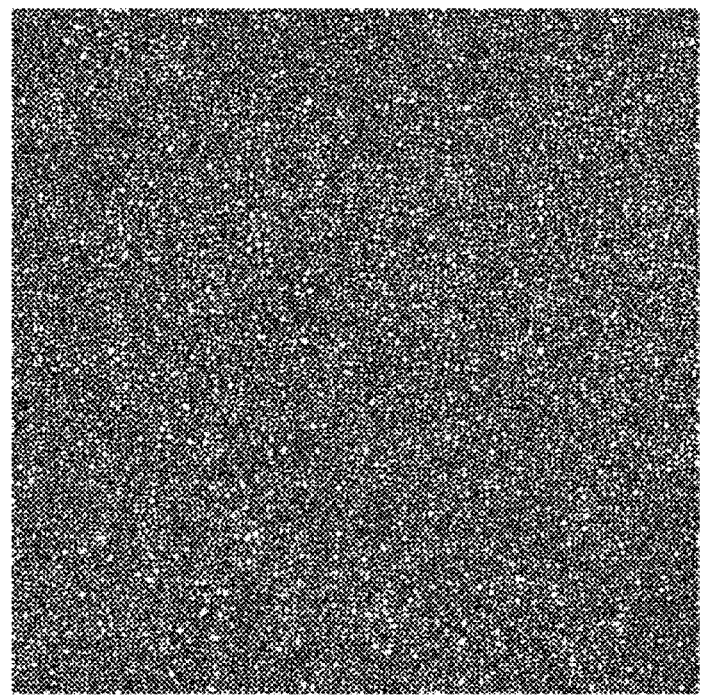
FIG. 10b shows the segmentation result with watershed transformation directly for the gradient map.

FIG. 10 is an image segmentation, including: (FIG. 10a) gradient map of FIG. 2a, and (FIG. 10b) the result of segmentation with watershed transformation directly for the gradient map. To have a gradient maps shown in FIG. 10, we use the Sobel operator and Roberts cross-gradient operator to calculate gradient maps in four directions including horizontal, vertical, and diagonal directions.

If the nuclei detection is performed using watershed transformation of gradient map directly, it may suffer from the problem of over-segmentation which is shown in FIG. 10b due to the existence of undesired regional minima and irrelevant noise in the gradient map. So it is required to design a filter that may be put at the front stage of nuclei detection to exclude the undesired regional minima and preserve the desired ones.

Nuclei initialization is required to resolve the over-segmentation problem by adopting the marker-controlled strategy followed by the technique of minima imposition in morphological image processing. Two kinds of markers are needed and defined as follows that roughly mark the locations of potential nuclei and their corresponding cell boundaries, respectively:

(1) Internal markers: they are the groups of connected pixels inside each region which is potential nucleus to be segmented;

(2) External markers: they are the groups of connected pixels relative to the boundary of each cell ideally.

We can imagine that internal markers are the initial points that guide the watershed transformation to obtain the desired solution that fits the size and shape of the desired nuclei with the limitation of external markers against over-flooding in watershed transformation.

Nuclei Initialization

Figure 11:
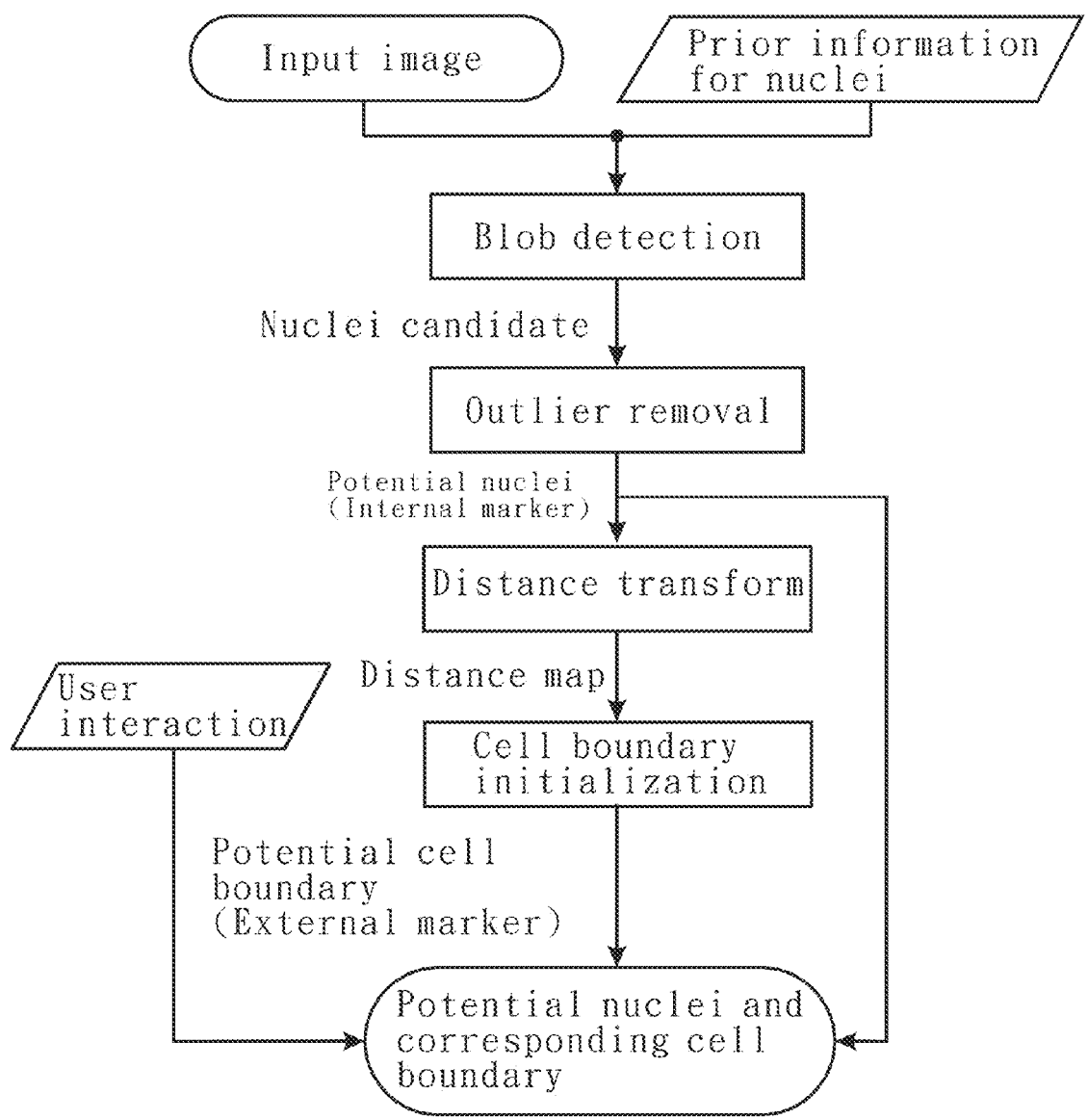
FIG. 11 shows a block diagram of a nuclei initialization.

FIG. 11 is a block diagram of a nuclei initialization. For nuclei initialization, the objective is to obtain the potential nuclei and their corresponding cell boundary with the concept of blob detection followed by outlier removal as well as distance transform and the main block diagram of nuclei initialization is presented in FIG. 11. Internal markers are used to mark the potential nuclei and their corresponding cell boundaries are marked with external markers. The internal markers with two conditions are defined for the current application:

(1) Regions of internal markers may be surrounded by pixels of higher intensity;

(2) All pixels in each region of internal markers form a connected component with homogeneous intensity.

To determine the internal markers, the blob detection is performed with prior information of the nuclei to be segmented to obtain nuclei candidate. Outliers of nuclei candidates will be excluded by outlier removal and then we can obtain potential nuclei which are also called internal markers. Subsequently, distance transform of internal markers is performed to obtain distance map followed by cell boundary initialization to determine the potential cell boundaries which are also called external markers. Of course, user interaction can also be considered for marker determination in nuclei initialization when medical doctors or staff expects to analyze the specific cells of interest.

Blob Detection

For the blob detection, the original image to be segmented is spanned into the scale-space to interpret the multi-scale representation of the image in order to extract structures of interest or feature points with the scale and spatial information concurrently. The input image is represented as the scale-space with Gaussian kernel g, and then the scale-space derivatives is utilized to extract the scale and spatial information of blobs concurrently in the images. The scale-space representation L of two-dimensional image f is denoted by:

$$L(\bullet,\bullet;\sigma)=f(\bullet,\bullet)*g(\bullet,\bullet;\sigma),$$

where g is the Gaussian operator denoted by $$g(x, y; \sigma) = \frac{1}{2\pi\sigma^2} e^{\frac{-(x^2+y^2)}{2\sigma^2}},$$

σ is the scale parameter, and * represents the convolution operator.

Figure 12A:
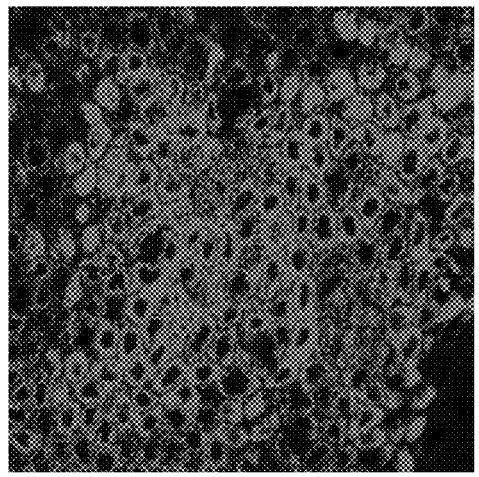
FIG. 12a shows an input image.
Figure 12B:
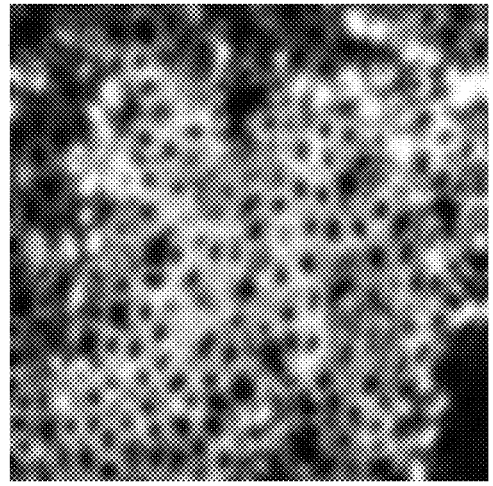
FIG. 12b shows a scale-space representation at scale $\sigma=5$.
Figure 12C:
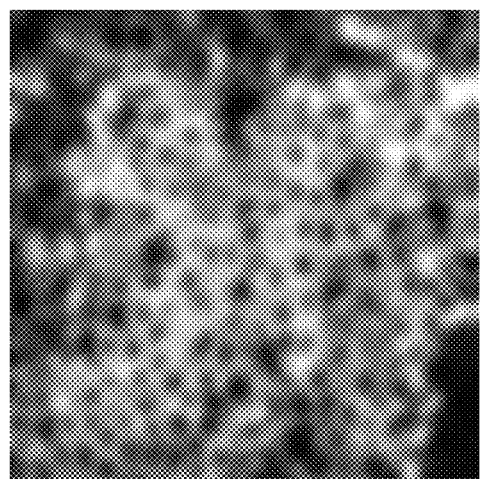
FIG. 12c shows a scale-space representation at scale $\sigma=7$.
Figure 12D:
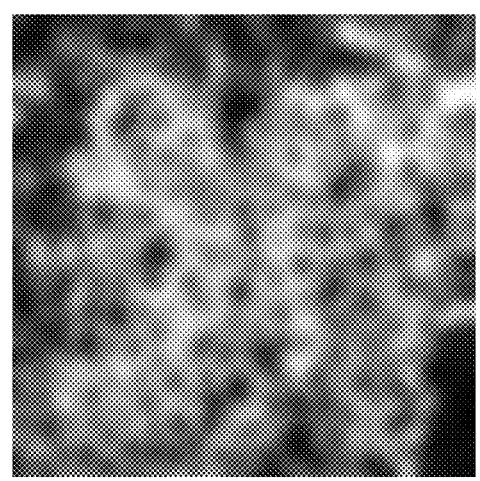
FIG. 12d shows a scale-space representation at scale $\sigma=9$.

The scale-space representation could be imagined that various rulers with various spatial resolution probe on the image to extract the structures with various scales for automatic scale selection. FIG. 12 is a scale-space representation at various scales, including: (FIG. 12a) input image, (FIG. 12b) scale-space representation at scale σ=5, (FIG. 12c) scale-space representation at scale σ=7, (FIG. 12d) scale-space representation at scale σ=9. FIG. 12a shows the input image, and its scale-space representations at scales σ=5, 7 and 9 are respectively shown in FIGS. 12b, 12c and 12d. It could be observed that different actual sizes of blobs are distinguished on the scale-space representation at different scales.

To extract the appropriate scale and also locality information coincidentally, scale-space derivatives and Hessian matrix are adopted for local extrema detection to obtain blob information. The scale-space derivative at scale σ is denoted by:

$$L_{x^\alpha y^\beta}(\bullet,\bullet;\sigma)=\partial_{x^\alpha y^\beta} L(\bullet,\bullet;\sigma)=(\partial_{x^\alpha y^\beta} g(\bullet,\bullet;\sigma))*f(\bullet,\bullet),$$

where L(•,•; σ) represents the scale-space representation at scale a and $\partial_{x^\alpha y^\beta}$ is the second-order partial differential operator with respect to x and/or y (α+β=2). Since the differential operator and Gaussian operator can be thought of as Linearly Time-Invariant (LTI) system satisfying the commutative property, scale-space derivatives could be obtained by performing convolution between input image f and Gaussian derivative operator. The Hessian matrix H(f) is the square matrix of second-order partial derivatives of a function f measuring the local principal curvature of a function in some directions and denoted by the following equation:

$$H(f) = \begin{bmatrix} \frac{\partial^2 f}{\partial x_1^2} & \frac{\partial^2 f}{\partial x_1 \partial x_2} & \cdots & \frac{\partial^2 f}{\partial x_1 \partial x_n} \\ \frac{\partial^2 f}{\partial x_2 \partial x_1} & \frac{\partial^2 f}{\partial x_2^2} & \cdots & \frac{\partial^2 f}{\partial x_2 \partial x_2} \\ \vdots & \vdots & \ddots & \vdots \\ \frac{\partial^2 f}{\partial x_n \partial x_1} & \frac{\partial^2 f}{\partial x_n \partial x_2} & \cdots & \frac{\partial^2 f}{\partial x_n^2} \end{bmatrix}$$

For two-dimensional image, 2×2 Hessian matrix $H_{2\times2}(L(x,y;\sigma))$ denoted in the following equation is utilized to measure the principal curvature of each pixel in horizontal and vertical directions and its eigenvalues are proportional to the principal curvature of L(x,y;σ):

$$H_{2\times2}(L(x, y; \sigma)) = \begin{bmatrix} L_{xx}(x, y; \sigma) & L_{xy}(x, y; \sigma) \\ L_{yx}(x, y; \sigma) & L_{yy}(x, y; \sigma) \end{bmatrix}.$$

For avoiding calculating the eigenvalues decomposition of Hessian matrix, a property in linear algebra is applied for simplification. Let λ1 and λ2 to be the eigenvalues of $H_{2\times2}(L(x,y;\sigma))$, then the determinant of the Hessian matrix is denoted by:

$$\det H_{2\times2}(L(x,y;\sigma))=L_{xx}(x,y;\sigma)L_{yy}(x,y;\sigma)-L_{xy}(x,y;\sigma)L_{yx}(x,y;\sigma)=\lambda1\lambda2.$$

We could use the above property to determine if a pixel is the isolated corner pixel or not. If the determinant of the Hessian matrix $H_{2\times2}(L(x,y;\sigma))$ is negative, the principal curvatures in horizontal and vertical directions have opposite signs that mean the pixel located in (x, y) is not a corner pixel but an edge or a ridge pixel. On the other hand, if the determinant of the Hessian matrix $H_{2\times2}(L(x,y;\sigma))$ is positive, the pixel located in (x, y) is an extremum which is the isolated corner point. Since the desired nuclei are located in the regional minima in the image, it is also needed to check if scale-space derivatives at scale σ $L_{xx}(x,y;\sigma)$ and $L_{yy}(x,y;\sigma)$ are also larger than zero to exclude the regional maxima and obtain the regional minima only. Additionally, the principal curvature of each pixel is measured not only in horizontal and vertical directions but also in two diagonal directions (degree 45 and degree 135) to obtain regional minima with more confidence.

Figure 13A:
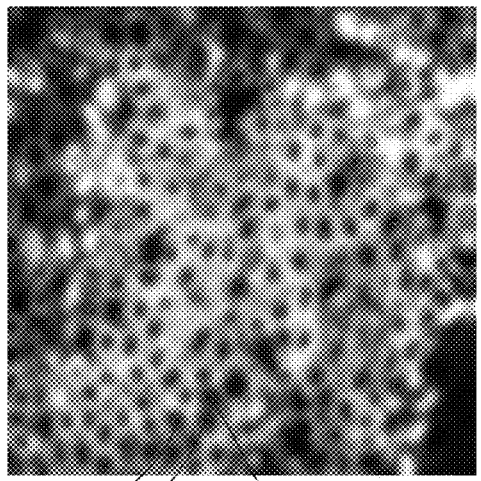
FIG. 13a shows a detected blob map at scale $\sigma=5$.
Figure 13B:
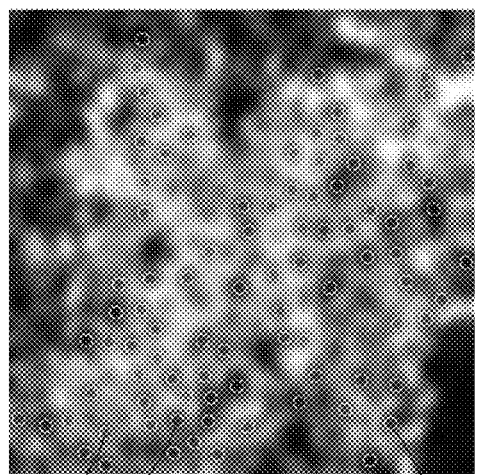
FIG. 13b shows a detected blob map at scale $\sigma=7$.
Figure 13C:
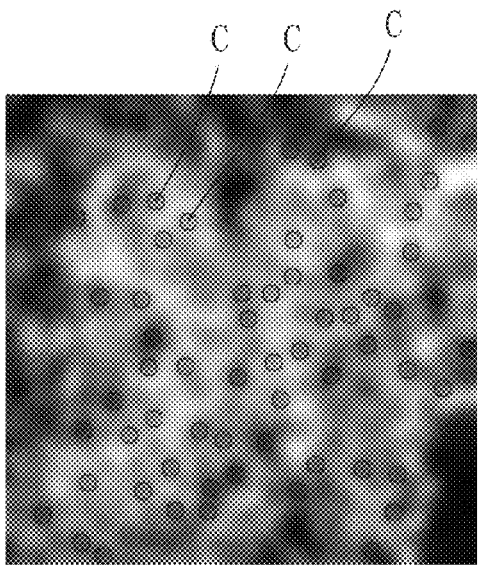
FIG. 13c shows a detected blob map at scale $\sigma=9$.
Figure 13D:
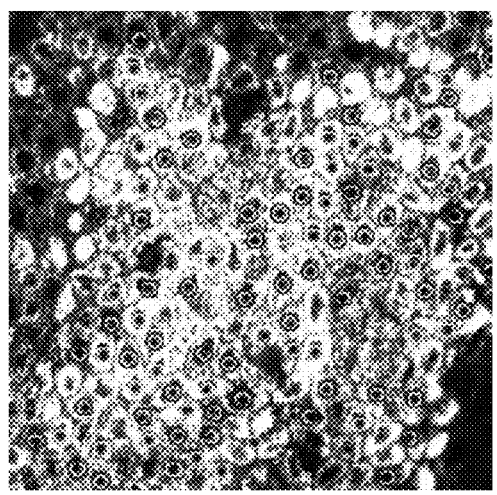
FIG. 13d shows a super-imposition of detected blob maps at scale $\sigma=5$, 7 and 9.
Figure 13E:
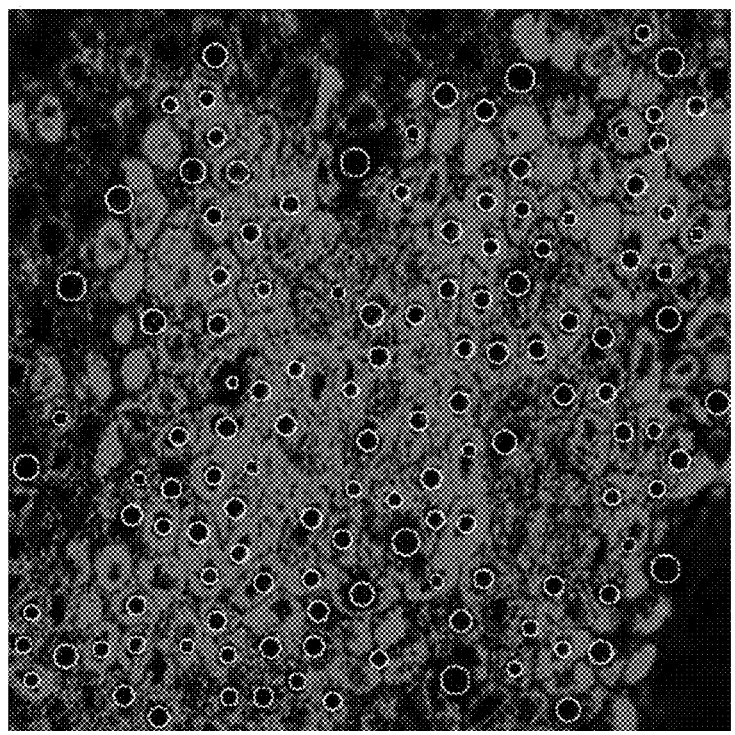
FIG. 13e shows the final detected blobs marked with white circles with appropriate scale information to be considered as nuclei candidates.

Since we also want to have the appropriate scale information of each detected blob with local information for the following outlier removal, a super-imposition for calculating average scale information is performed to the detected blob maps at various scales for automatic scale selection to obtain the final detected blobs with appropriate scale information. FIG. 13 is an automatic scale selection, including: (FIG. 13a) detected blob map at scale σ=5, (FIG. 13b) detected blob map at scale σ=7, (FIG. 13c) detected blob map at scale σ=9, (FIG. 13d) super-imposition of detected blob maps at scale σ=5, 7 and 9, and (FIG. 13e) final detected blobs to be considered as nuclei candidates. FIGS. 13a, 13b and 13c illustrate the detected blob map at scales σ=5, 7 and 9 with various circles "C". FIG. 13d shows the super-imposition of detected blob maps at scales σ=5, 7 and 9 to estimate the appropriate scale information of each detected blob. FIG. 13e shows the final detected blobs marked with white circles with appropriate scale information to be considered as nuclei candidates.

Outlier Removal

Figure 14A:
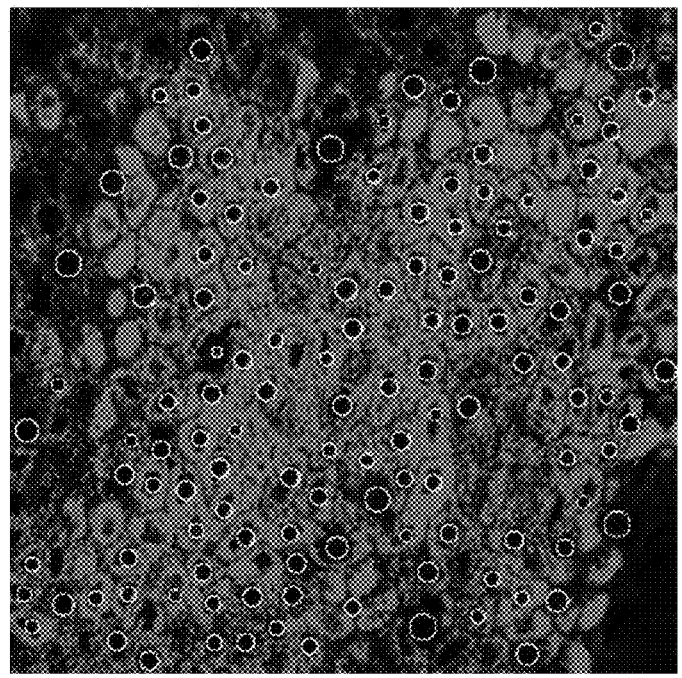
FIG. 14a shows nuclei candidates with existing outliers.
Figure 14B:
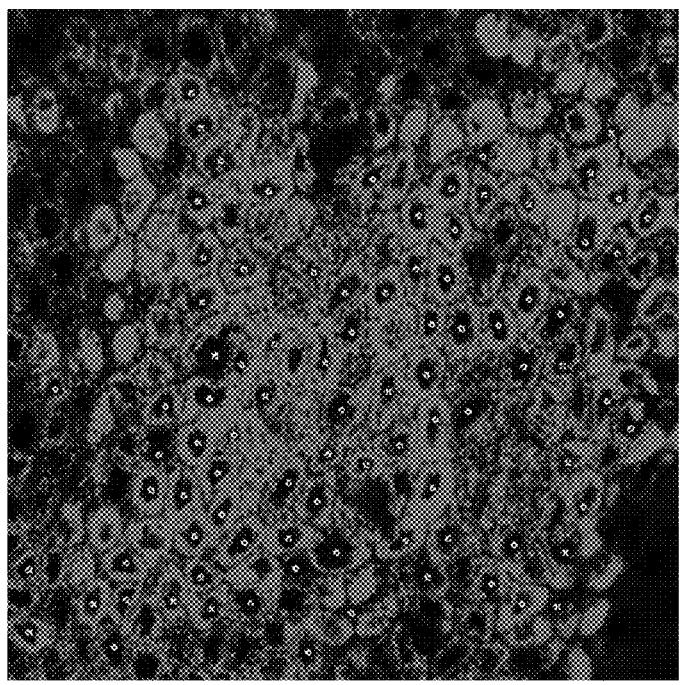
FIG. 14b shows potential nuclei without outliers.
Figure 16A:
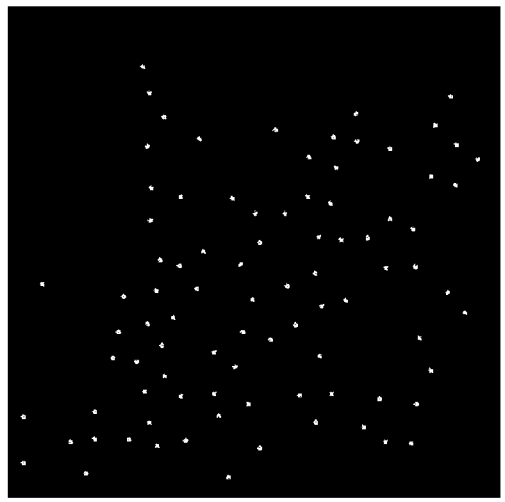
FIG. 16a shows internal markers.
Figure 16B:
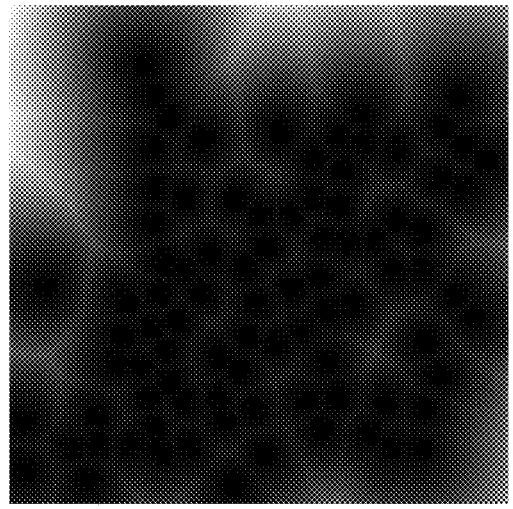
FIG. 16b shows a Euclidean distance map.
Figure 16C:
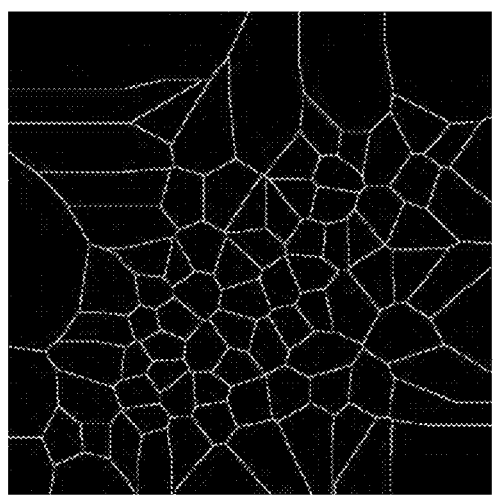
FIG. 16c shows external markers.
Figure 16D:
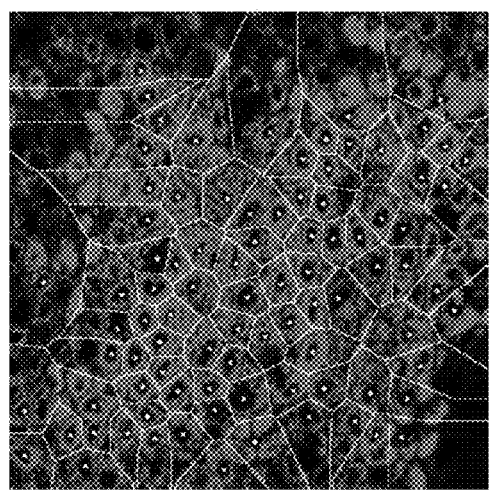
FIG. 16d shows a marker map imposed on the original image.

There may be some outliers in the nuclei candidates and local constraints must be considered to remove the outliers. As the assumption, valid nuclei must be surrounded by the cytoplasm whose intensity and area may be larger enough. FIG. 14 is an internal marker determination, including: (FIG. 14a) nuclei candidates with existing outliers, (FIG. 14b) potential nuclei without outliers. FIG. 14a shows nuclei candidates marked with white circles on original image with existing outliers and some candidates are not surrounded completely by cytoplasm. Local constraints adaptive to blob size are considered to exclude the outliers and preserve the valid nuclei that are completely surrounded by cytoplasm whose intensity and area are both large enough. FIG. 14b illustrates the nuclei candidates without outliers which are considered as potential nuclei and also called internal markers.

Distance Transform

The detected blobs without outliers shown in FIG. 14b are used as the internal markers marking the rough position of potential nuclei and then it also needs external markers delineating cell boundaries roughly to form a complete marker map for watershed transformation with marker-controlled strategy. Since it is not desired for the external markers to be too close to the boundaries of the regions which are nuclei to be segmented, the Euclidean distance maps of internal-marker map is calculated, which is the Euclidean distance between each pixel and the nearest pixel belonging to internal markers. Euclidean distance map is another representation of the original binary image, which labels each pixel the distance between that pixel and the nearest non-zero pixel in the binary image using Euclidean distance metric.

FIG. 15 is a distance transform using Euclidean distance metric, including: (FIG. 15a) 4×4 binary image, (FIG. 15b) distance map of the binary image, (FIG. 15c) pixel values of the binary image, and (FIG. 15d) pixel values of the transformed image in FIG. 15b. FIG. 15 shows an example of distance transform using Euclidean distance metric. FIG. 15a is a 4×4 binary image whose pixel value is shown in FIG. 15c. FIG. 15b is the distance map of FIG. 15a using Euclidean distance metric. If it is imagined that the set of pixels whose pixel values are one in binary image is an object, say, a nucleus and other set of pixels whose pixel values are zero is the background in FIG. 15a, then the distance map shown in FIG. 15b of this binary image has the ability to roughly delineate the potential boundary of this nucleus with a set of pixels having higher intensity than the nucleus. Hence, distance transform indeed can generate a useful representation applied in the area of cell segmentation.

FIG. 16 is an external marker determination, including: (FIG. 16a) internal markers, (FIG. 16b) Euclidean distance map, (FIG. 16c) external markers, (FIG. 16d) the marker map imposed on the original image. For the nuclei initialization of original image shown in FIG. 12a, the detected blobs without outliers are used as the internal markers shown in FIG. 16a with white dots and then its Euclidean distance maps are calculated as shown in FIG. 16b. Subsequently, watershed transformation of this Euclidian distance map is performed to obtain the external markers shown in FIG. 16c with white grid lines. We impose the internal and external marker maps on the original image in FIG. 16d for visualization (the cell boundary initialization step). It can be observed that the internal-marker map indeed roughly marks the potential nuclei and external-marker map roughly draw the cell boundary. Additionally, the external markers partition the image into many regions and each region contains only one single internal marker. In other words, the problem of cell segmentation is simplified to partition each of these regions into two parts that is a single object which could be only one pixel or a connected component inside the nucleus to be segmented and its background. Therefore, one-to-one correspondence between the markers and the segmentation result can be obtained, which can enhance the accuracy of nuclei segmentation.

Morphological Image Processing

Now, the internal and external marker map marking potential nuclei and their corresponding cell boundaries respectively are obtained, which are required for watershed transformation with marker-controlled strategy. It is expected to design a filter using morphological minima imposition to remove the undesired regional minima in the gradient map and preserve the desired ones to resolve the over-segmentation problem of watershed transformation.

The objective of the morphological transformation is to extract relevant structures of the image by probing the image with structuring element chosen according to some prior knowledge. A structuring element is a known shape used to probe an image with the purpose of extracting the desired objects in images.

The geodesic transformation and morphological reconstruction based on erosion operation are introduced here for minima imposition technique. In geodesic transformation, we consider two input images, the morphological transformation is applied to the first image and then it is forced to remain either above or below the point-wise pixel values of the second image. Geodesic erosion of size n of a marker image f with respect to a mask image g is denoted by:

$$\epsilon_g^{(n)}(f) = \epsilon^{(n)}(f) \vee g \text{ with } \epsilon^{(0)}(f) = f,$$

where $\vee$ is the point-wise maximum operator, and (f) is the erosion operator. The objective of geodesic erosion is to limit the shrinking of the marker image f by the mask image g. The step of equation above is that marker image f is eroded by the structuring element and resulting eroded image is then forced to remain above the mask image g.

Figure 17A:
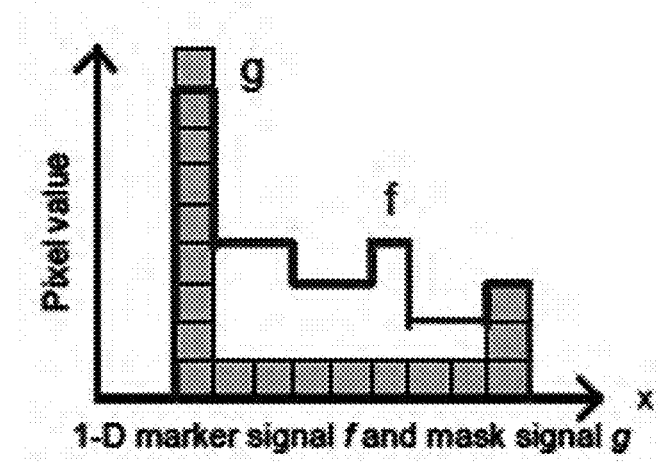
FIG. 17a shows a 1-D marker signal f and mask signal g.
Figure 17B:
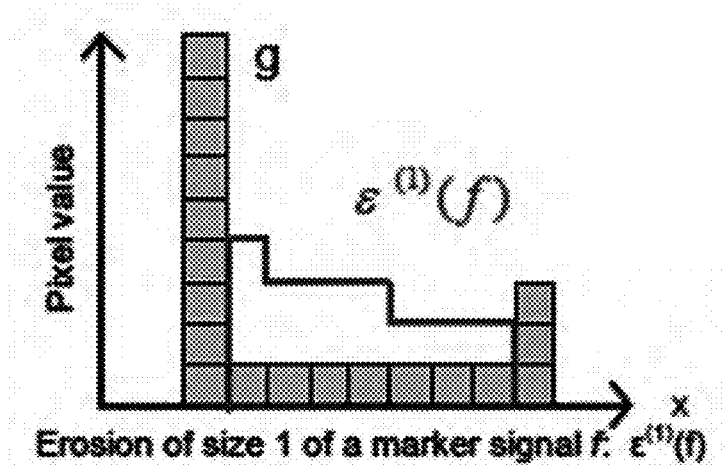
FIG. 17b shows an erosion of size 1 of a marker signal f.
Figure 17C:
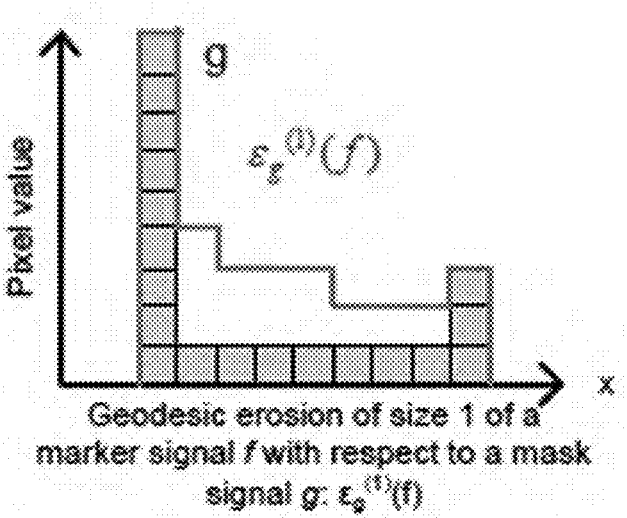
FIG. 17c shows a geodesic erosion of size 1 of a marker signal f with respect to a mask signal g.
Figure 18A:
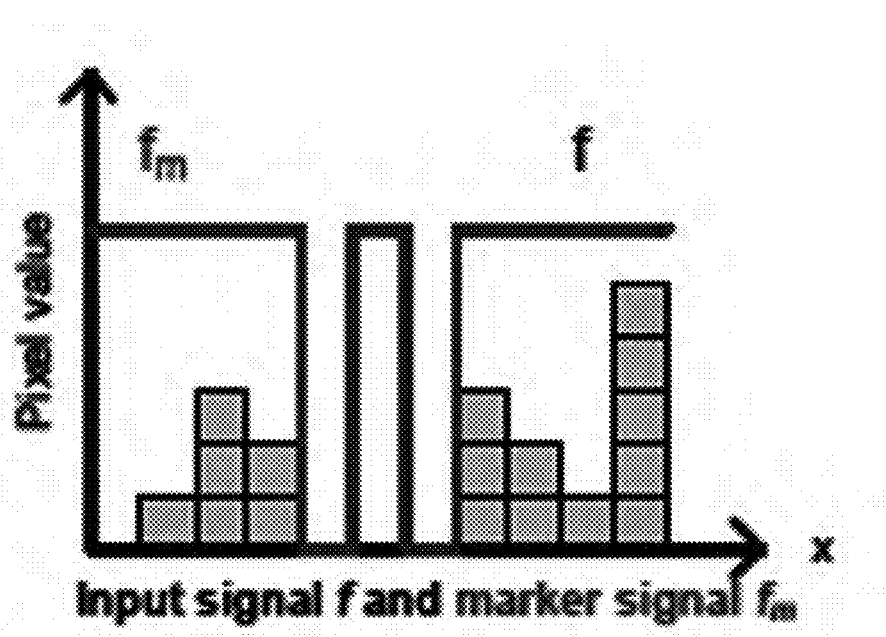
FIG. 18a shows an input signal f and marker signal $f_m$.
Figure 18B:
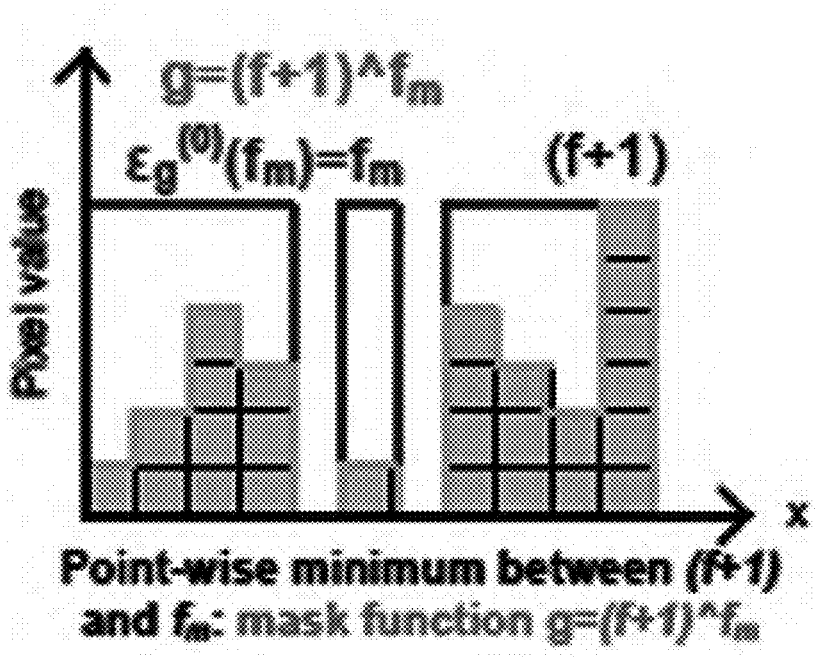
FIG. 18b shows a point-wise minimum between (f+1) and $f_m$.
Figure 18C:
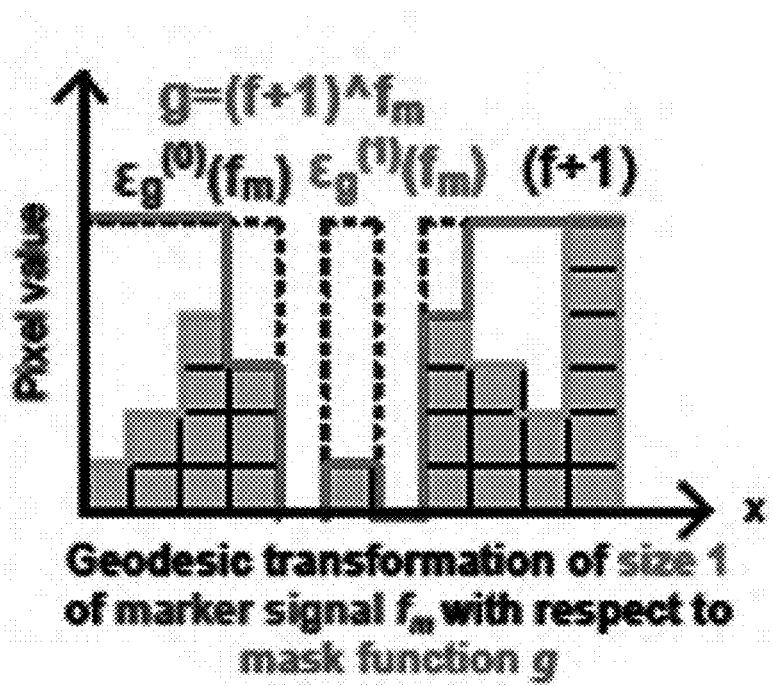
FIGS. 18c-18f show the geodesic transformations of size 1-4 of the marker signal $f_m$ with respect to the mask function g.
Figure 18D:
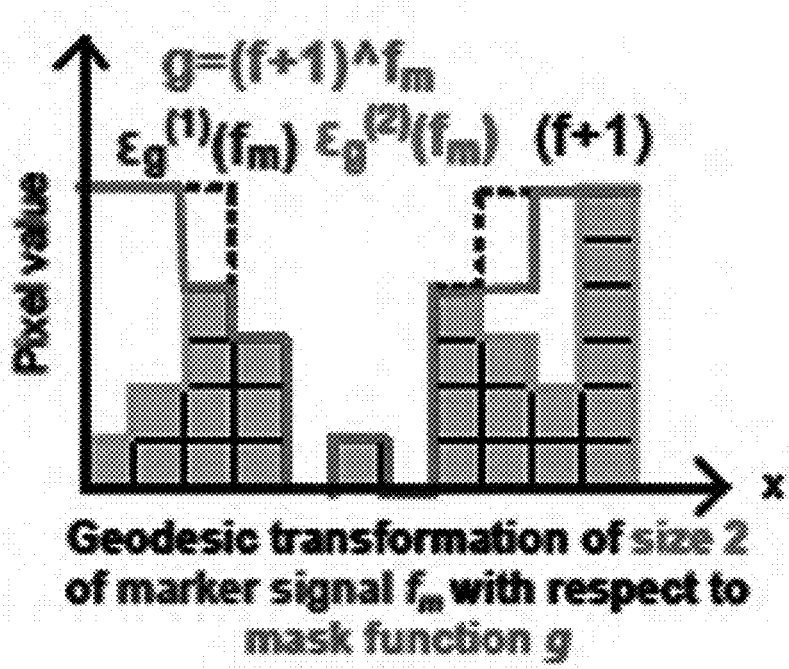
Figure 18E:
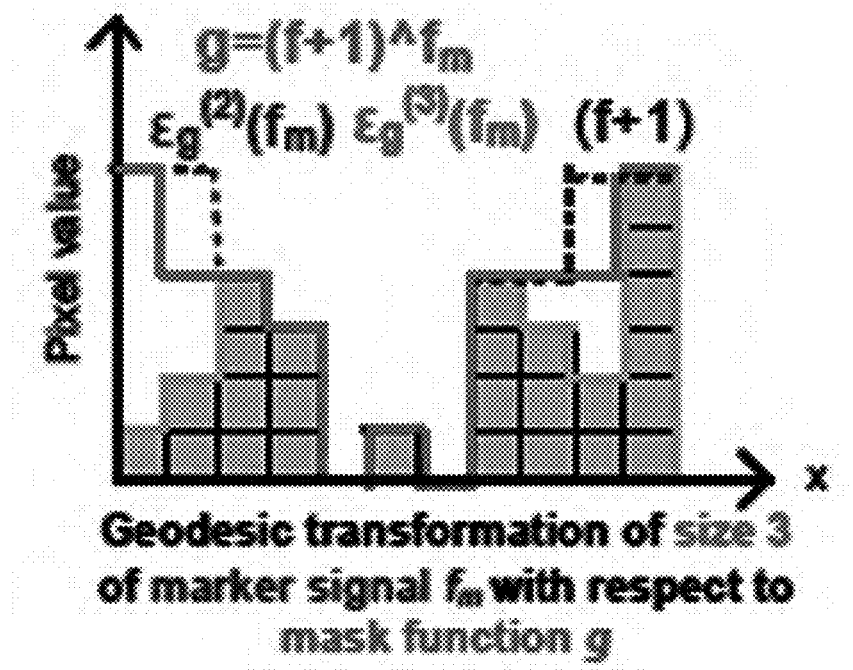
Figure 18F:
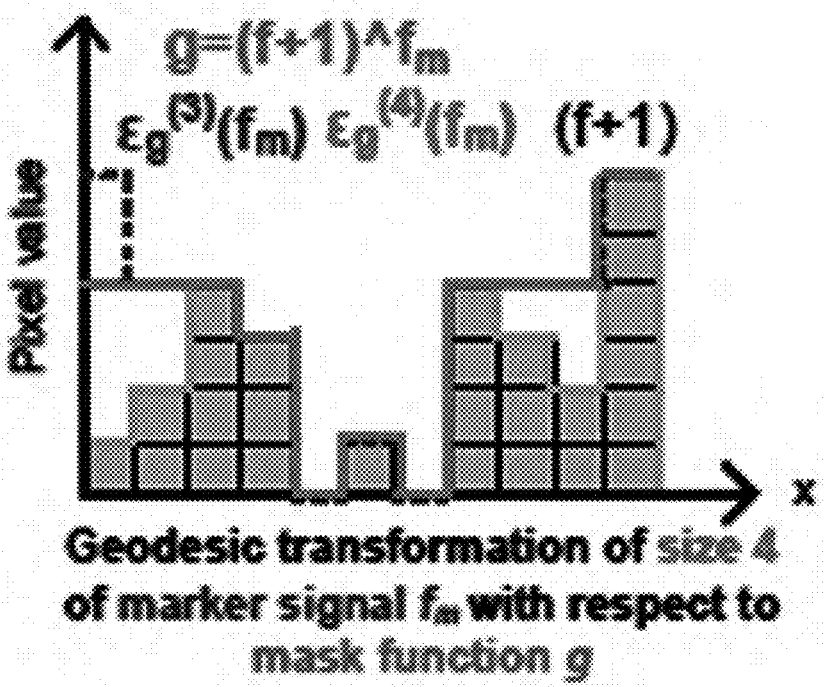
Figure 18G:
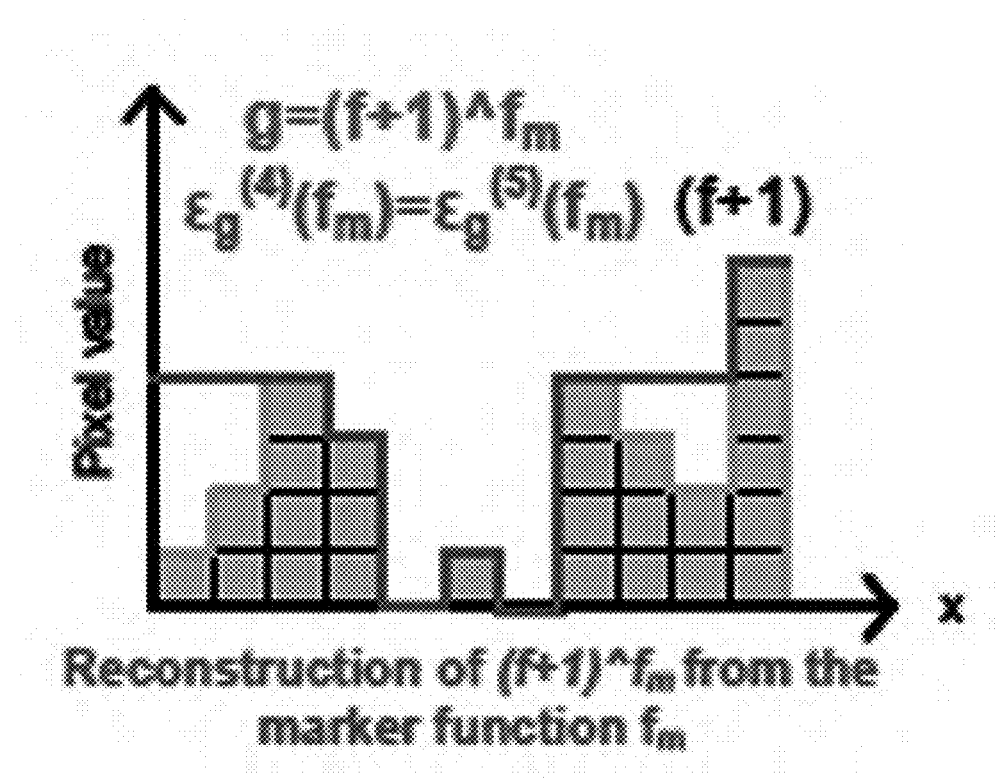
FIG. 18g shows a reconstruction of $(f+1)\hat{}f_n$, from the marker function $f_m$.

FIG. 17 is an example of geodesic erosion, including: (FIG. 17a) 1-D marker signal f and mask signal g, (FIG. 17b) erosion of size 1 of a marker signal f, (FIG. 17c) geodesic erosion of size 1 of a marker signal f with respect to a mask signal g. FIG. 17 shows an example of geodesic erosion for 1-D signal and it could be observed that the shrinking of the marker signal f is limited by the mask signal g.

Morphological reconstruction is a finite number of iterations of geodesic transformation until stability is reached, which is more common used in practice than geodesic transformation. Reconstruction by erosion of a mask image g from a marker image f is denoted by:

$$R_g^\epsilon(f) = \epsilon_g^{(i)}(f),$$

where i is such that $\epsilon_g^{(i)}(f) = \epsilon_g^{(i+1)}(f)$. Minima imposition is one of the applications of reconstruction by erosion that limits the regional minima of mask image g only occur at the location of pixels belonging to marker image f is denoted by:

$$R_{(f+1) \hat{\wedge} f_m}^\epsilon (f_m),$$

wherein $f_m(p) = 0$ if pixel belongs to marker image, and $f_m(p) = t_{max}$ if otherwise. $t_{max}$ is the maximum pixel value in the range of mask image g, e.g., if the bit-width of pixel in mask image g is 8, then $t_{max}$ 255, and $\hat{\wedge}$ is a point-wise minimum operator.

FIG. 18 is an example of minima imposition: (FIG. 18a) input signal f and marker signal $f_m$, (FIG. 18b) point-wise minimum between (f+1) and $f_m$, (FIG. 18c) to (FIG. 18O) geodesic transformation of size 1-4 of marker signal $f_m$ with respect to mask function g, (FIG. 18g) reconstruction of (f+1) $\hat{\wedge} f_m$ from the marker function $f_m$. FIG. 18 shows an example of minima imposition for 1-D signal and it could be found that the local minima of the input signal f is limited to only occur at the location that marker signal $f_m$ marks.

FIG. 19 is a morphological minima imposition: (FIG. 19a) gradient map of FIG. 2a, (FIG. 19b) marker map including internal and external markers in white part, (FIG. 19c) filtered gradient map of FIG. 2a after the morphological minima imposition, (FIG. 19d) gradient map specified in the green block "G", (FIG. 19e) marker pixels represented in the part "P" and also imposed on the gradient map shown in FIG. 19d, (FIG. 19O) filtered gradient map specified in the green block "G". The internal and external markers are used to perform minima imposition on the gradient map to obtain filtered gradient map, whose regional minima only occurs at the location of internal and external marker pixels. FIG. 19a shows the gradient map of FIG. 2a that roughly enhance the boundaries of nuclei and the homogeneous regions in the gradient map correspond to regional minima in input image and then marker map shown in FIG. 19b including internal and external markers are utilized to modify the gradient map using minima imposition and obtain the filtered gradient map shown in FIG. 19c. To explain clearly, we focus on the details in the green block "G" and the gradient map, marker map, and the filtered gradient map in the green block "G" are shown in FIGS. 19d, 19e and 19f, respectively. In FIG. 19e, the marker pixels are represented and also imposed on the gradient map for ease of indicating the location of markers.

Figure 19A:
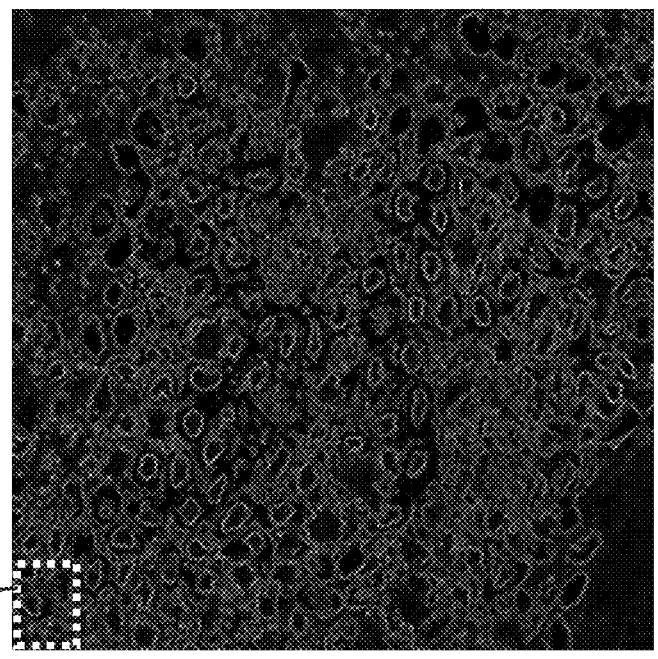
Figure 19B:
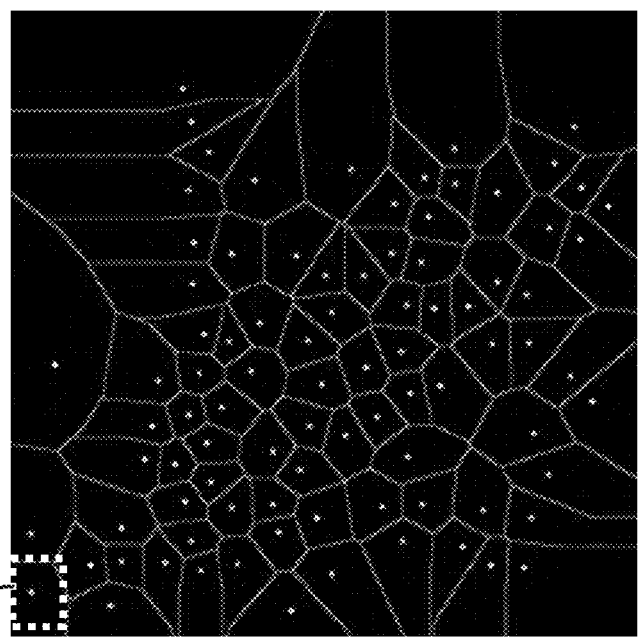
FIG. 19b shows a marker map.
Figure 19C:
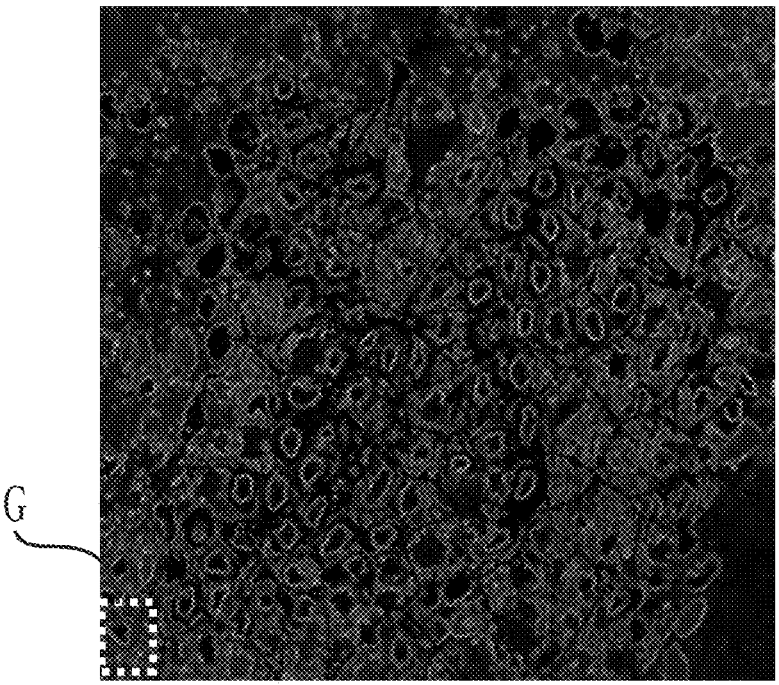
FIG. 19c shows a filtered gradient map of FIG. 2a after the morphological minima imposition.
Figure 19D:
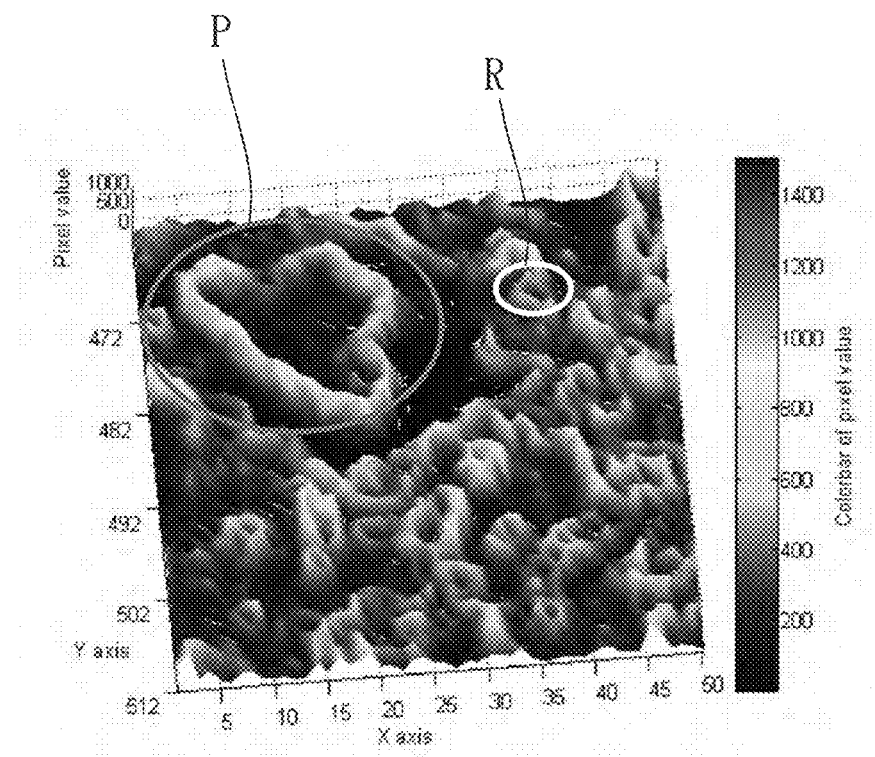
FIG. 19d shows a gradient map.
Figure 19E:
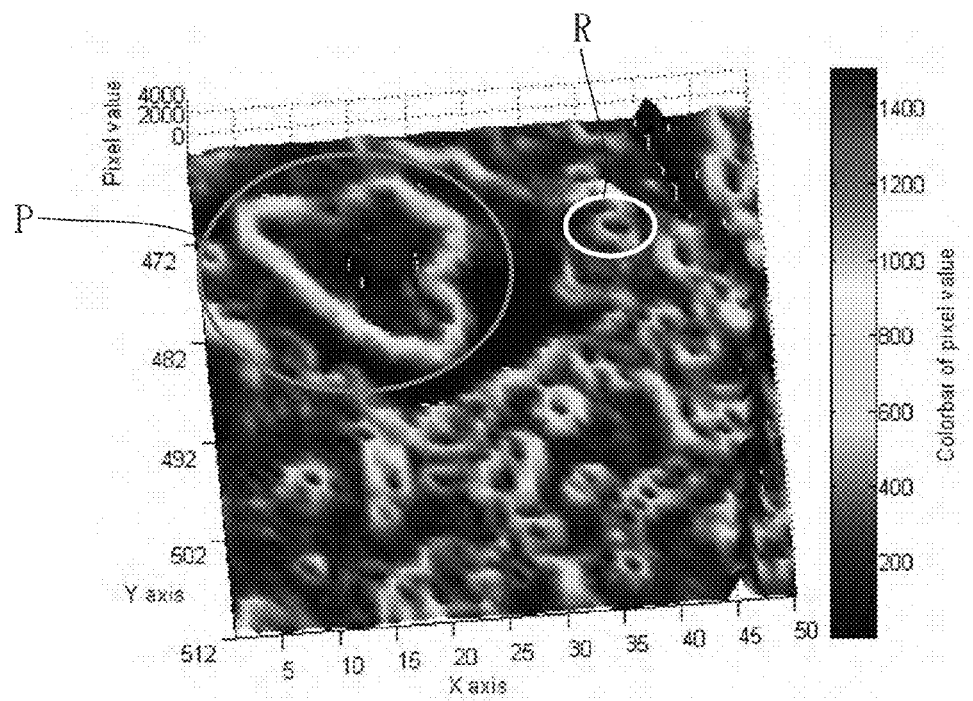
FIG. 19e shows marker pixels.
Figure 19F:
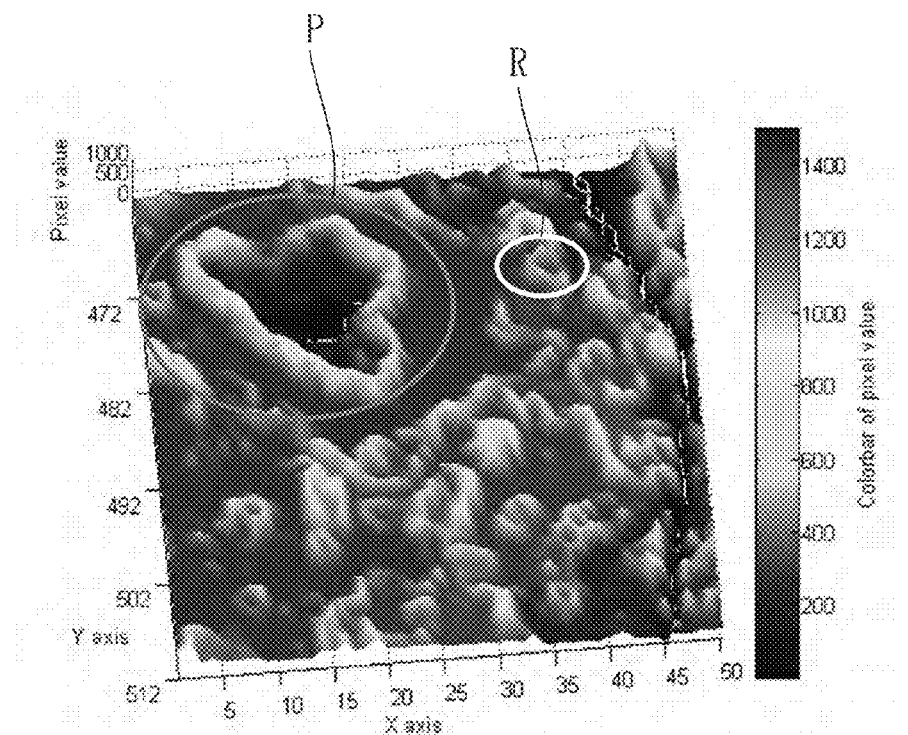
FIG. 19f shows a filtered gradient map.

For example, there is a regional minimum in the circle "R" in FIG. 19d, and it is not marked by marker pixels in FIG. 19e, so the regional minimum is removed after the morphological minima imposition in FIG. 19f. On the other hand, there is a regional minimum in the circle in FIG. 19d, and it is marked by marker pixels in FIG. 19e, so we will preserve this regional minimum after the morphological minima imposition in FIG. 19f. Hence, morphological minima imposition only allows regional minima in gradient map occur at co-located position of white marker pixels in the marker map shown in FIG. 19b.

Nuclei Detection and Validation

Figure 2A:
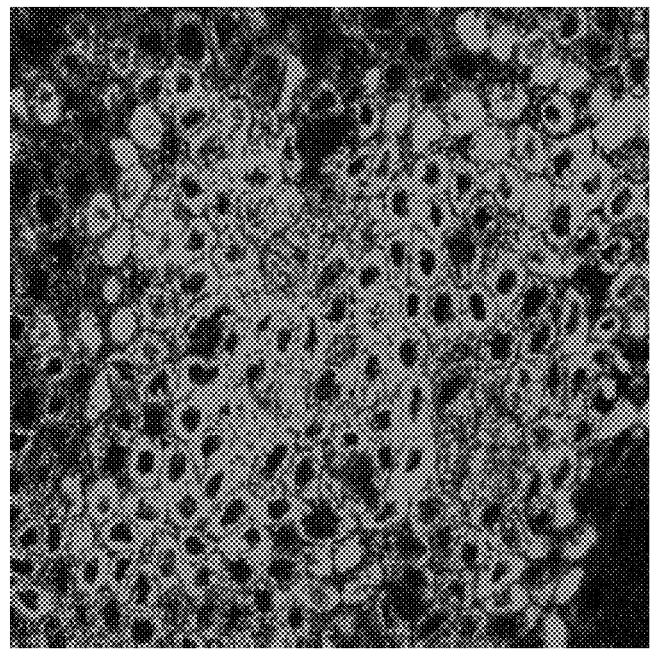
FIG. 2a shows an input image.
Figure 2B:
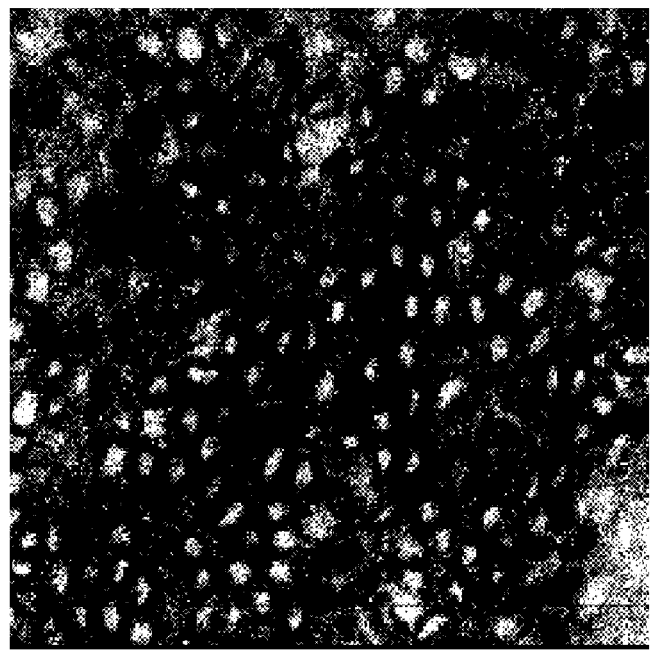
FIG. 2b shows the segmentation result with image thresholding of intensity.
Figure 3A:
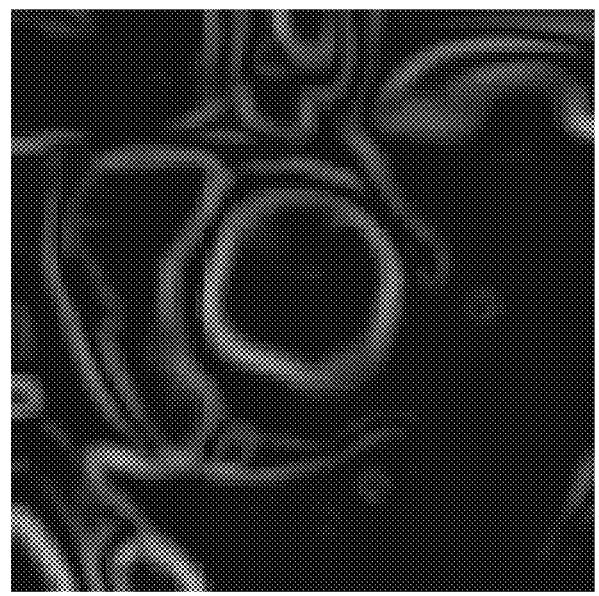
FIG. 3a shows a two-dimensional gray-level image.
Figure 3B:
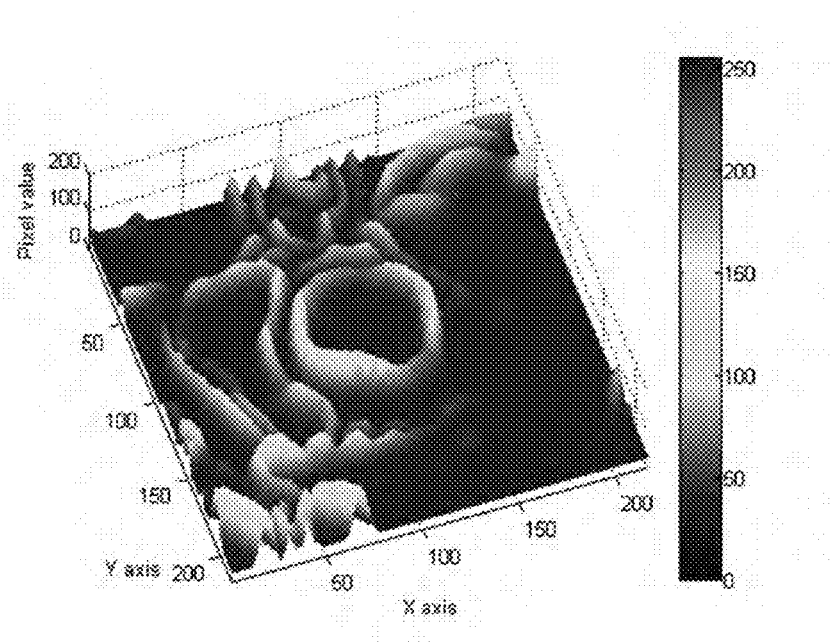
FIG. 3b shows a three-dimensional topographic surface.
Figure 4:
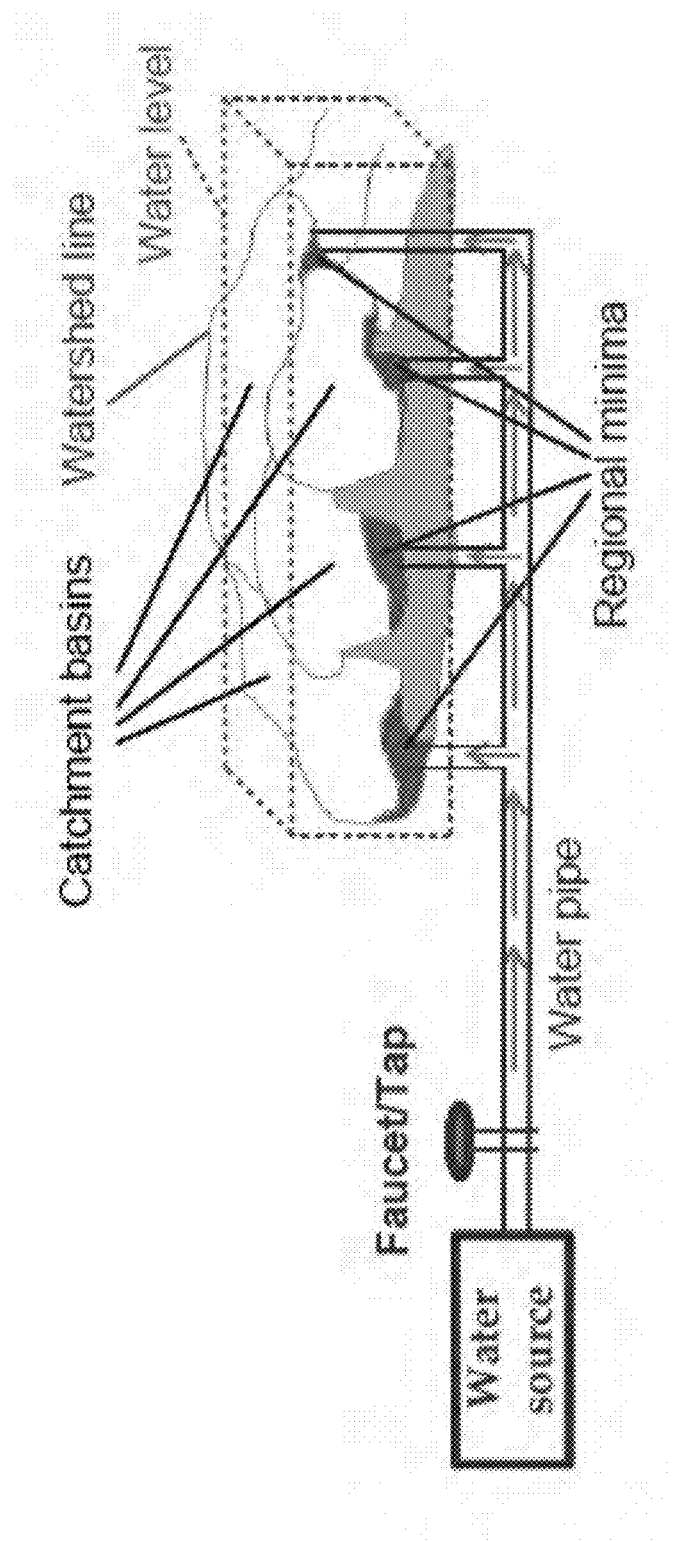
FIG. 4 shows a topographical view of the gray-level image.
Figure 5A:
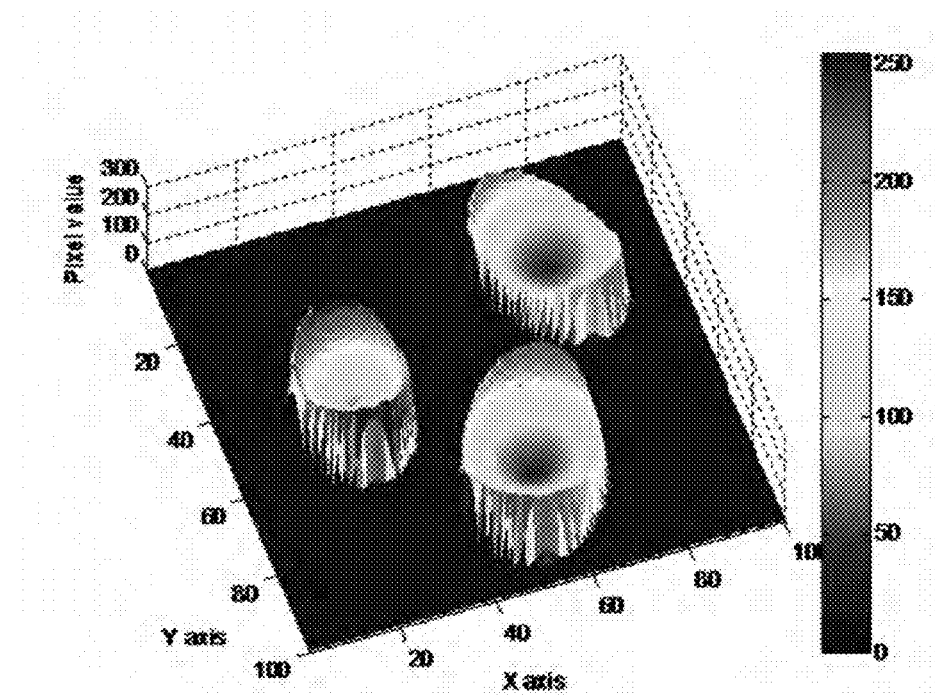
FIG. 5a shows an original topographic surface with four catchment basins.
Figure 5B:
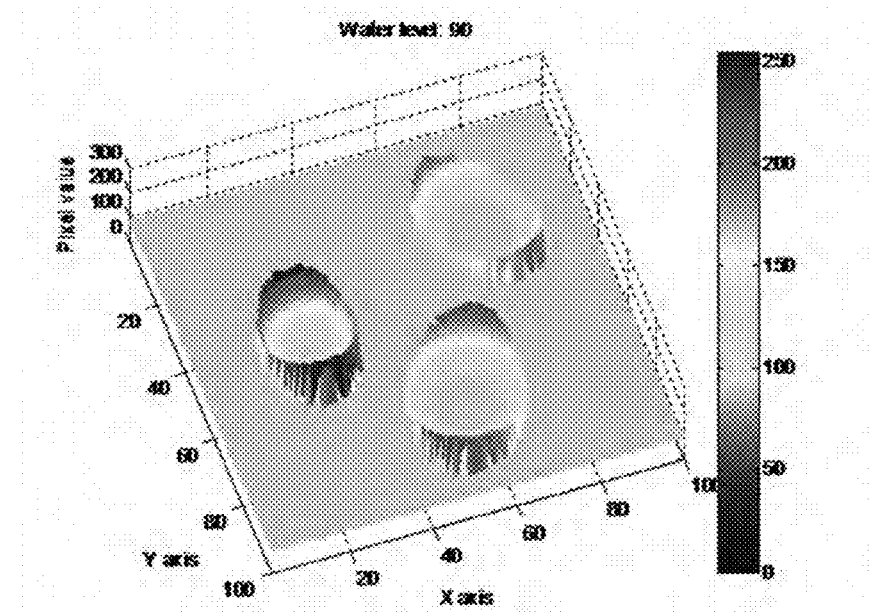
FIG. 5b shows a topographic surface with water level being 90.
Figure 5C:
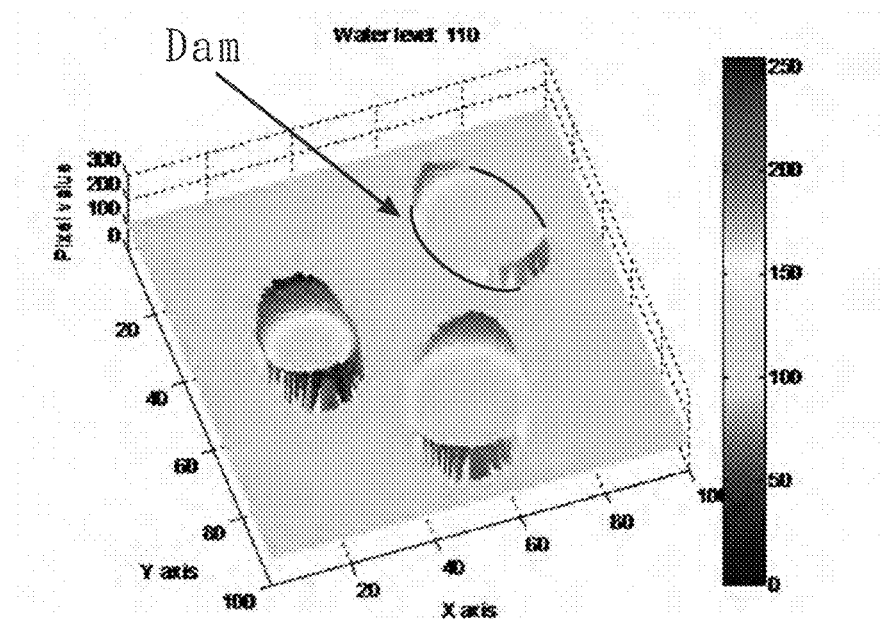
FIG. 5c shows a topographic surface with water level being 110.
Figure 5D:
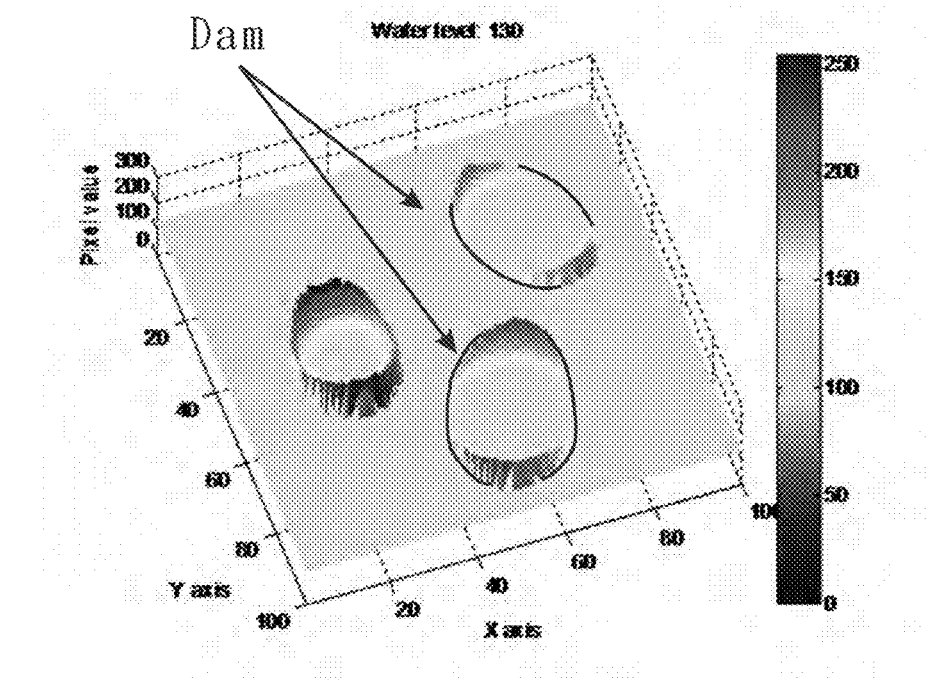
FIG. 5d shows a topographic surface with water level being 130.
Figure 6:
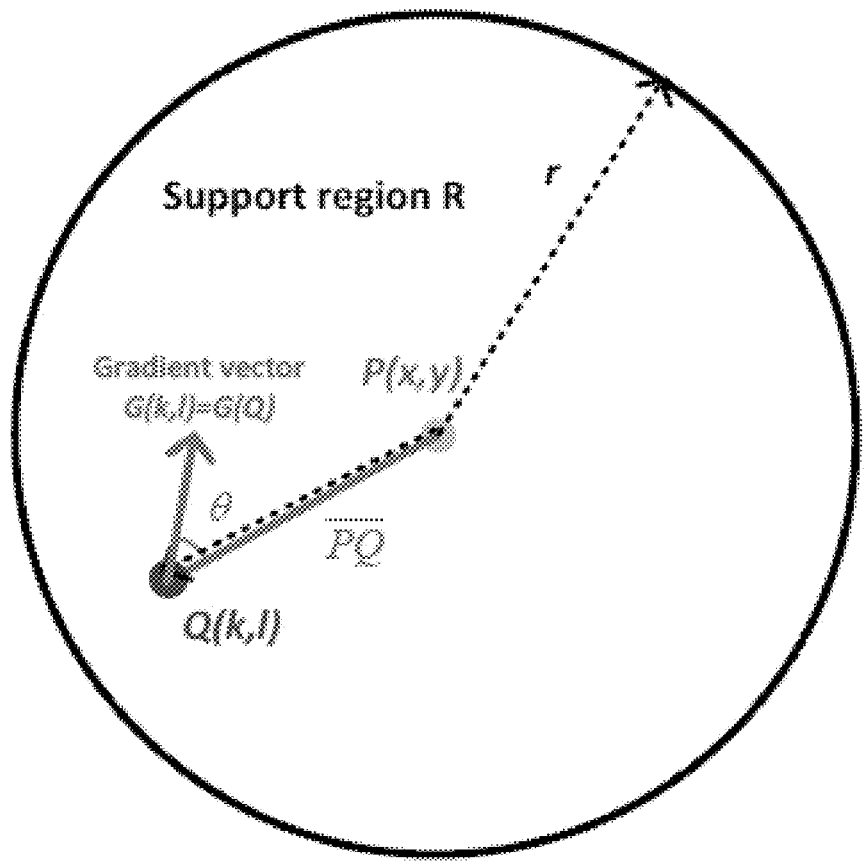
FIG. 6 shows a support region of convergence index filter.
Figure 7A:
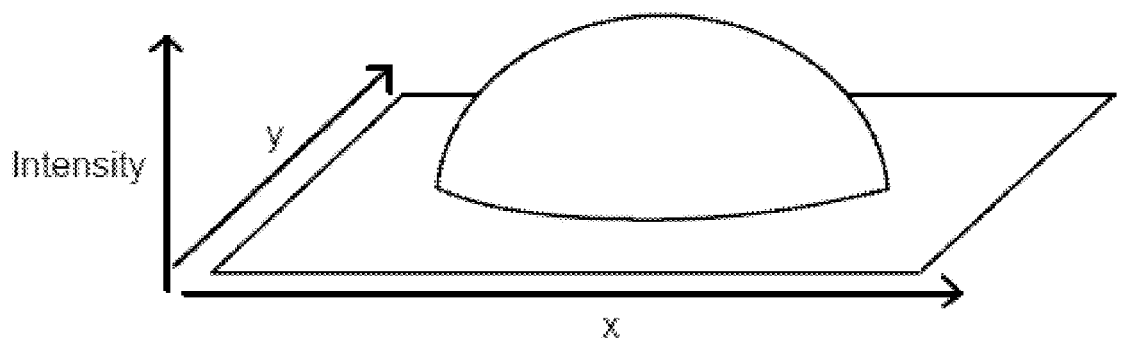
FIG. 7a shows a rounded convex region.
Figure 7B:
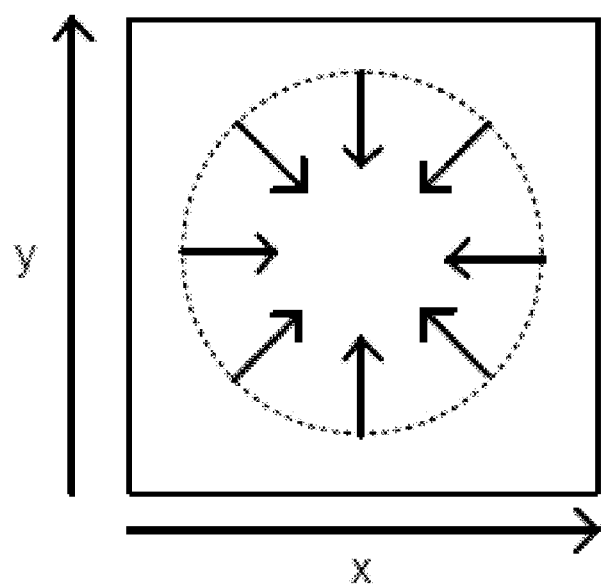
FIG. 7b shows the distribution of gradient vectors.

FIG. 20 is the segmented nuclei of FIG. 2a, including: (FIG. 20a) without consideration of shape compactness, (FIG. 20b) consideration of shape compactness, (FIG. 20c) segmented nuclei imposed on the original image. The watershed transformation is used again to calculate the watersheds of the filtered gradient map shown in FIG. 19c and obtain the segmented nuclei shown in FIG. 20a from original skin cell images. To have more confidence for the segmented nuclei, the shape of nuclei is also taken into consideration. Shape descriptors are the crucial measures in the application of computer vision and patter recognition area, and especially in the microscopy imaging analysis, they own the ability of excluding the undesired objects to enhance the accuracy of analysis. Compactness which is an indicator of detection for irregular cancer cells is utilized in the stage of nuclei validation and it is defined as: Compactness=$A/P^2$ where A represents the area of object and P represents the perimeter of the object. For example, there are two kinds of shapes in FIGS. 20d and 20e that the left one is ellipse and the right one is irregular starfish-like shape. The ellipse has larger area and smaller perimeter, so it has higher compactness. However, the starfish-like shape has smaller area and larger perimeter, so it has lower compactness. As the observation, the shape of cells is very close to circle or ellipse with higher compactness, so we use this property to exclude the undesired objects with low compactness to enhance the accuracy of nuclei segmentation.

Figure 20A:
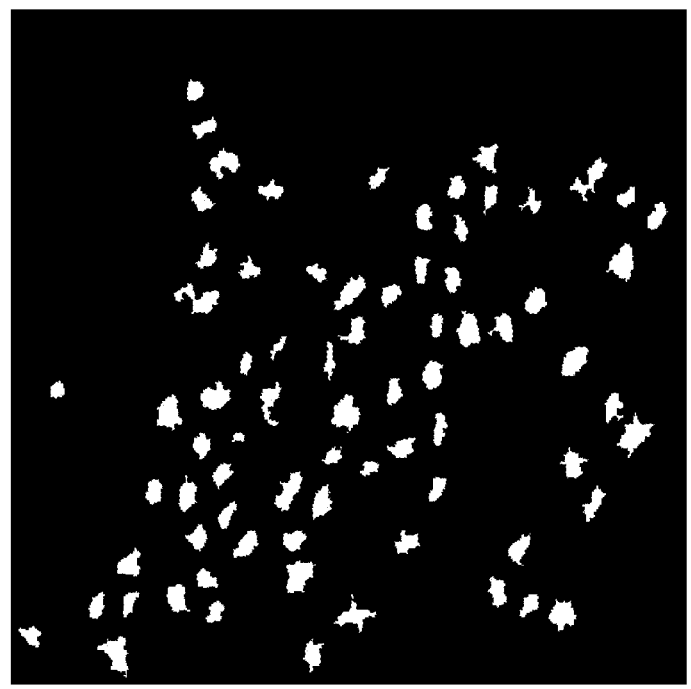
FIG. 20a shows the segmented nuclei of FIG. 2 without consideration of shape compactness.
Figure 20B:
FIG. 20b shows the segmented nuclei of FIG. 2 with consideration of shape compactness.
Figure 20C:
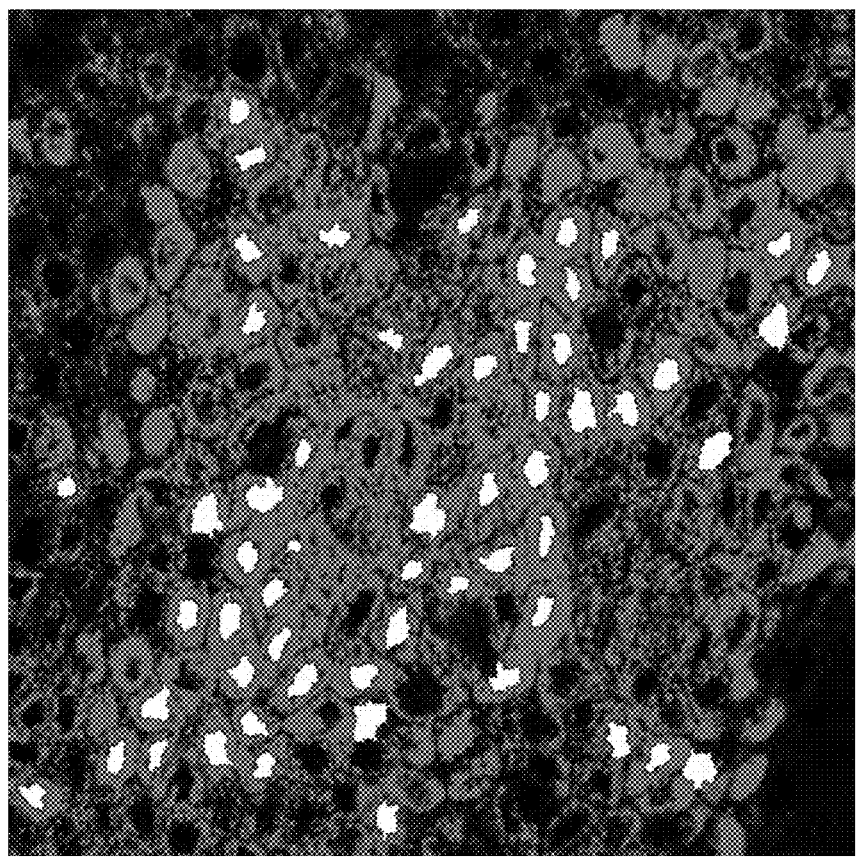
FIG. 20c shows the segmented nuclei imposed on the original image.
Figure 20D:
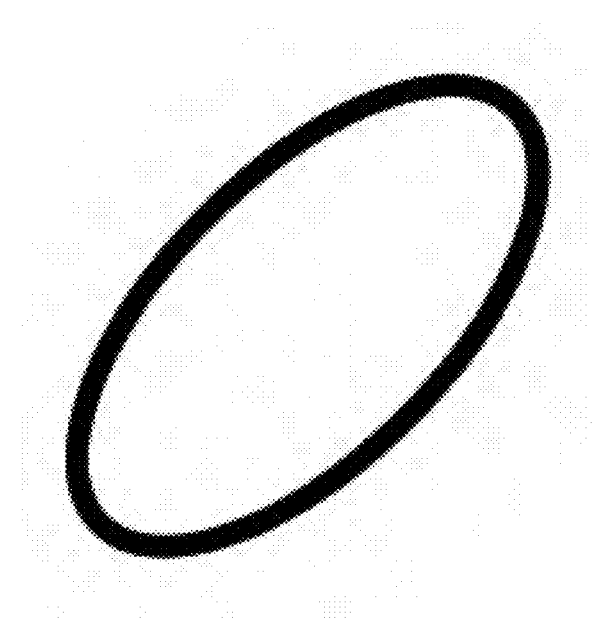
FIG. 20d shows an ellipse having a larger area and a smaller perimeter, which results in a higher compactness.
Figure 20E:
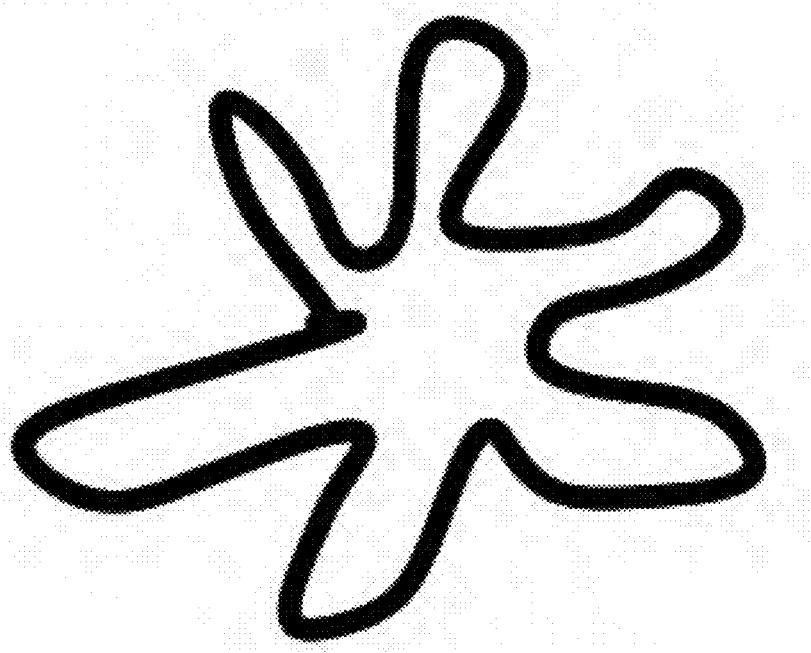
FIG. 20e shows a starfish-like shape having a smaller area and a larger perimeter, which results in a lower compactness.

FIG. 20a shows segmented nuclei without consideration of shape compactness, which exist several outliers with lower compactness that do not belong to nuclei. FIG. 20b shows valid nuclei considering shape compactness that preserve confident nuclei with higher compactness and remove outliers with lower compactness to enhance the accuracy of segmentation results. White valid nuclei are also imposed on the original image shown in FIG. 20c for visualization and the accuracy of nuclei segmentation is desirable.

Cytoplasm Segmentation

For cytoplasm segmentation, convergence index filter is adopted based on valid nuclei with intuitive parameter setting and convergence index filter is suitable for cell segmentation in low-contrast and noisy microscopy images since it considers gradient vectors instead of intensity of images, which does not require pre-processing that may lose some important medical information in diagnosis to enhance contrast and remove irregular noise. Additionally, the parameter setting for convergence index filter is intuitive for user or medical staff to adjust easily according to some fundamental information of input biomedical images to be analyzed like size or shape of cells without technical details of algorithmic processing. For example, cell sizes in biomedical images are related to sampling rate in front-end acquisition procedure and also affected by what kinds of cells or tissues to be analyzed, so it is very intuitive for users to set parameters considering only observable characteristics of input images. One thing worth mentioning is that convergence index filters consider contextual and locality information to have confident segmentation results and reduce uncertainty of segmentation resulting from low contrast and noise in images.

There are some assumptions that may be made for using convergence index filter to segment cytoplasm:

(1) The shape of cells and also their corresponding nuclei are all convex regions;

(2) Each cytoplasm and its corresponding nucleus are almost concentric and gradient vector of each pixel belonging to cytoplasm and its corresponding nucleus has trend to point toward the same cell center.

Figure 21:
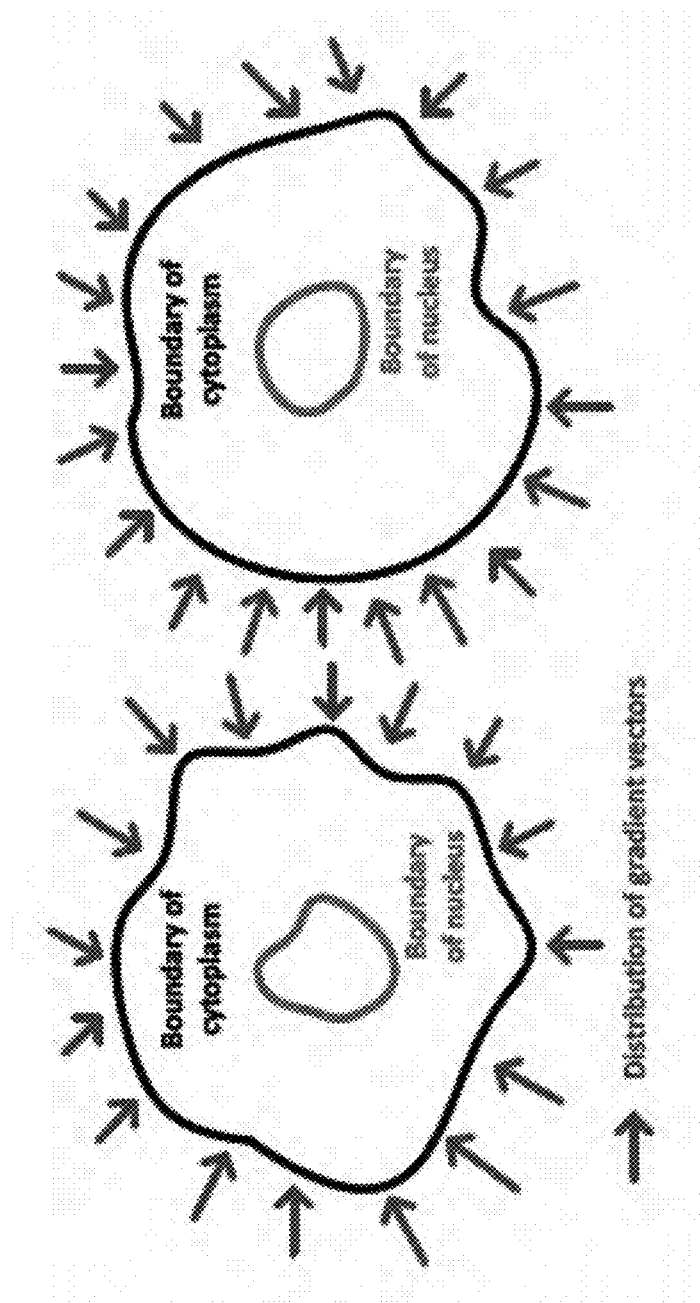
FIG. 21 shows the distribution of gradient vectors around two adjacent cells.
Figure 22A:
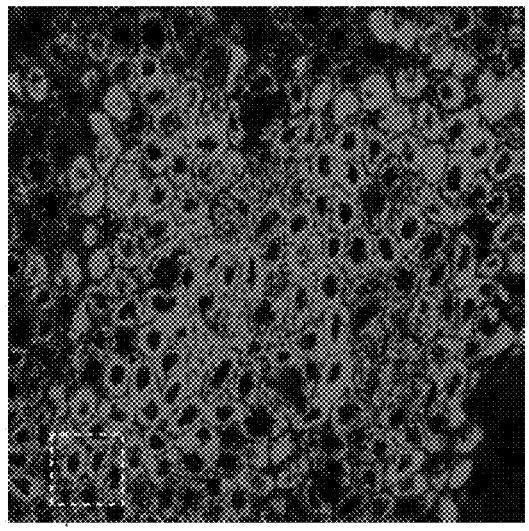
FIG. 22a shows an original image with a block "B1".
Figure 22B:
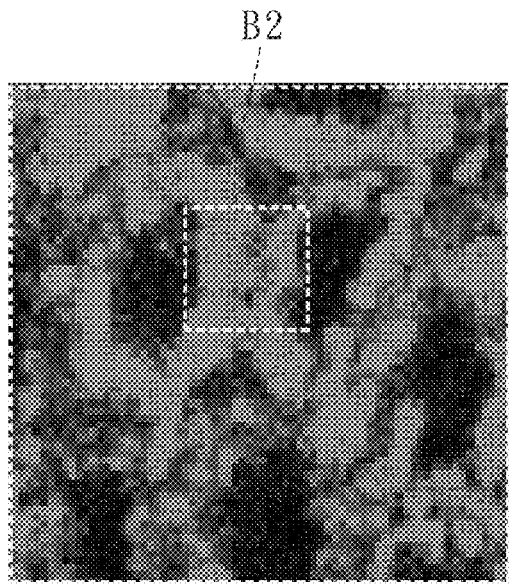
Figure 22C:
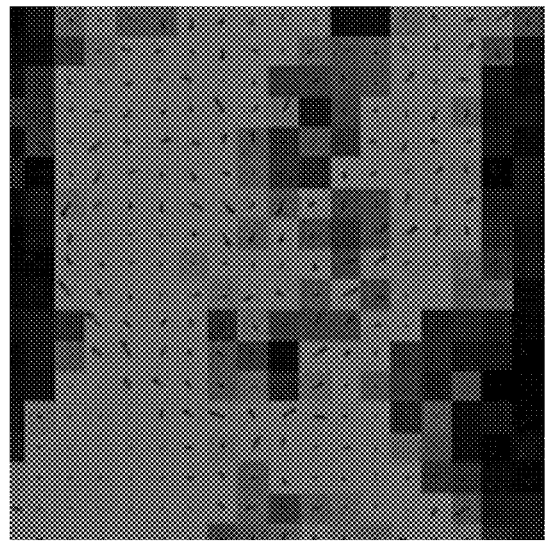
FIG. 22c shows gradient vectors of all pixels located in a block "B2" indicated in FIG. 22b.

FIG. 21 is distribution of gradient vectors around two adjacent cells. FIG. 22 is gradient map of two adjacent cells, including: (FIG. 22a) original image with a block "B1", (FIG. 22b) gradient vectors of all pixels located in the block "B2" indicated in FIG. 22a, (FIG. 22c) gradient vectors of all pixels located in the block "B2" indicated in FIG. 22b. The assumptions above make it available to utilize some information of valid nuclei to detect size and shape of cytoplasm for each cell. FIG. 21 shows an example to this idea mentioned above and there are two adjacent cells with convex region containing their boundaries of cytoplasm and nuclei in black and grey peripheries, respectively in the figure. Arrows represent the distribution of gradient vectors around cytoplasmic boundaries that point toward the corresponding cell center. To observe this phenomenon on the actual biomedical images, we focus on the gradient map of two adjacent cells enclosed by block "B1" indicated in FIG. 22a. FIG. 22b shows gradient vectors of all pixels located in the block "B1" imposed on the original image. If we further focus on the boundary of these two adjacent cells in the block "B2" indicated in FIG. 22b, it can be observed that the distribution of gradient vectors on each cytoplasm point toward the center of corresponding cell shown in FIG. 22c. The property of the distribution of gradient vectors could be used to assist in cytoplasm segmentation.

Proposed local filter is designed by the inspiration of the concept of sliding band filter described before in convergence index family, which own capability in determining its support region with variable distance between the inner or outer boundary and its center on each orientation subjecting to adaptive constraints of minimum and maximum distance, $R_{min}$ and $R_{max}$, from the inner and outer boundary to the center of support region on each orientation for each cell to be analyzed.

Figure 23:
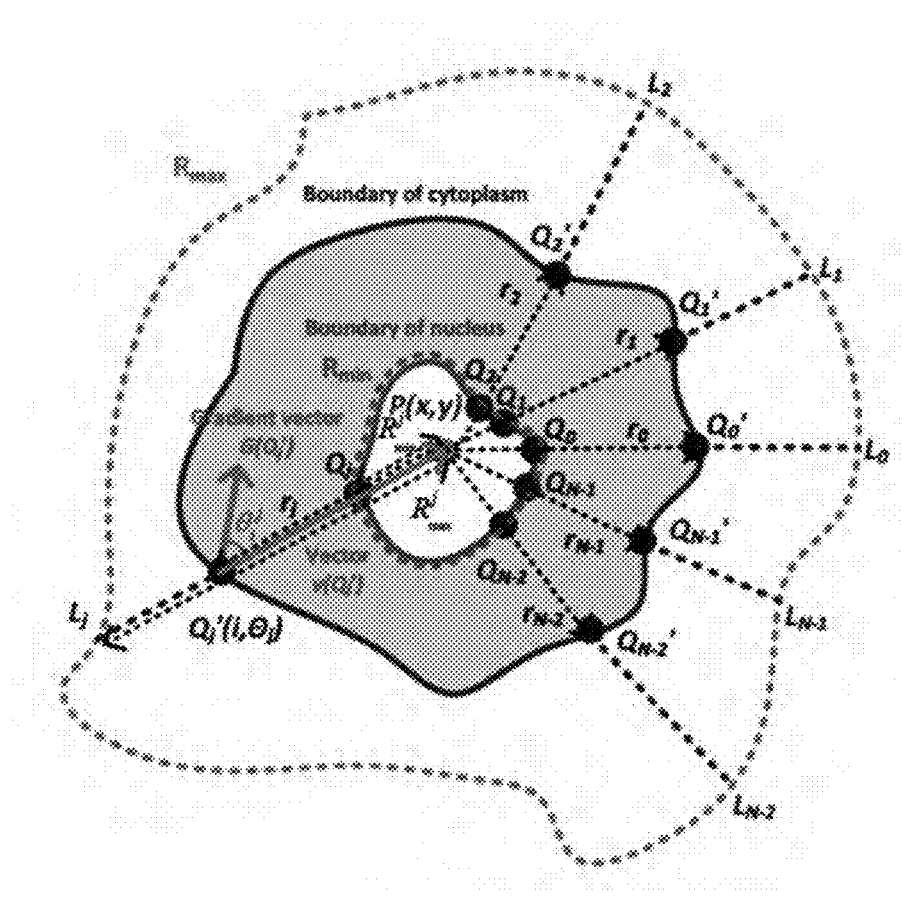
FIG. 23 shows a support region of a proposed local filter.
Figure 24A:
Figure 24B:
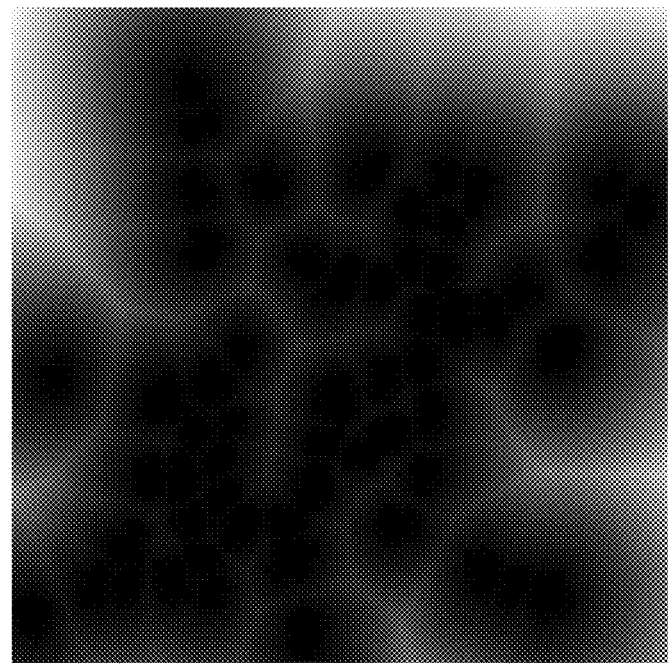
FIG. 24b shows a Euclidian distance map of segmented nuclei.
Figure 24C:
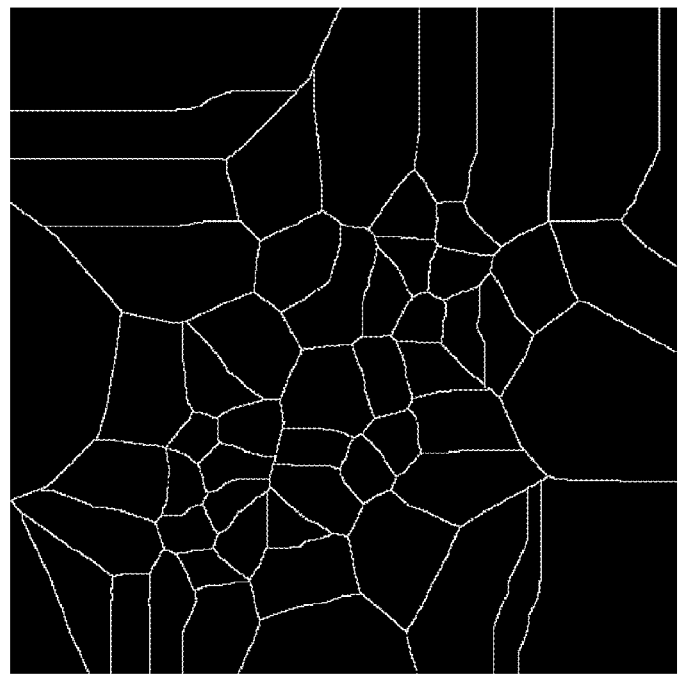
FIG. 24c shows a maximum boundary $R_{max}$ of a potential cytoplasmic region for each cell.
Figure 24D:
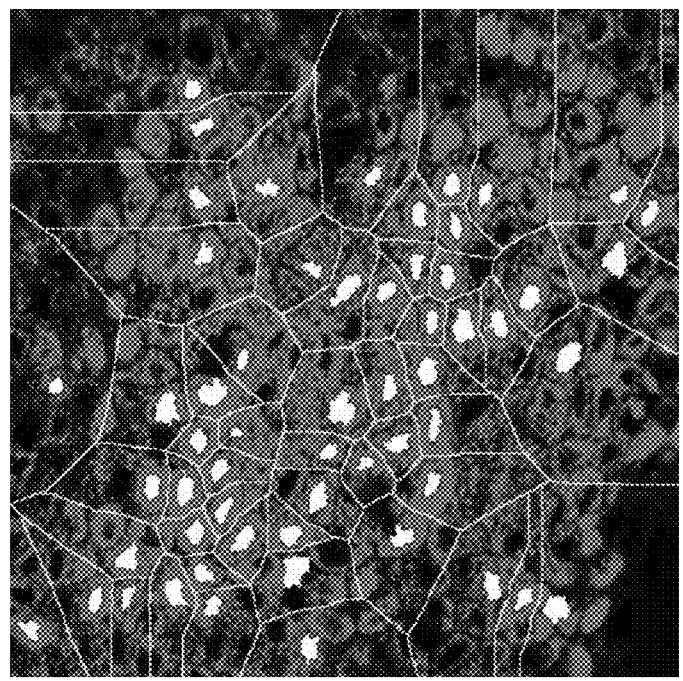

FIG. 23 is a support region of proposed local filter. FIG. 23 shows the support region R of proposed local filter consisting of a grey region with different length of inner and outer boundary also having variable distance between the inner or outer boundary and its center P on each orientation for one cell to be analyzed. For cytoplasm segmentation, the information of valid nuclei including shape and position is used to deal with this task.

Since the objective here is cytoplasm segmentation, point P can be considered as the center of one white valid nucleus and its surrounding grey support region R can be thought of as desired cytoplasmic region of that cell we want to detect.

Cytoplasm Initialization

First, it is needed to determine two kinds of constraints that are $R_{min}$ and $R_{max}$ which represent minimum and maximum distance from the inner and outer boundary to the center P of support region on each orientation, respectively for cytoplasm segmentation with higher accuracy. These two constraints are adaptive to the shape and position of each valid nuclei described before. The boundary of each valid nucleus can be thought of as minimum boundary $R_{min}$ of cytoplasm on that cell that makes sure that the candidates of cytoplasmic region do not fall into and maybe outside the nuclear region. For determination of $R_{max}$, we adopt the concept of distance transform described in before to generate the distance map of valid nuclei to delineate the maximum boundary of potential cytoplasmic region for each cell. Therefore, we make the robust and confident restriction of boundary of potential cytoplasmic region with adaptive constraints $R_{min}$ and $R_{max}$ for each cell, which not only can avoid overlap of segmented cells but also can resolve the issues of cell segmentation of touching cells with indistinct boundaries for multivariate biomedical images.

FIG. 24 is a procedure of determination of $R_{min}$ and $R_{max}$, including: (FIG. 24a) segmented nuclei of FIG. 2a, (FIG. 24b) Euclidian distance map of segmented nuclei, (FIG. 24c) maximum boundary $R_{max}$ of potential cytoplasmic region for each cell, and (FIG. 24d) imposition of valid nuclei, $R_{min}$ and $R_{max}$ together on FIG. 2a. FIG. 24 shows the procedure of determination of $R_{min}$ and $R_{max}$. FIG. 24a shows the valid nuclei of FIG. 2a whose boundaries are minimum boundaries $R_{min}$ of cytoplasm to be segmented. FIG. 24b shows its Euclidian distance map. Then watershed transformation is applied to this distance map to roughly draw the maximum boundary $R_{max}$ of potential cytoplasmic region for each cell shown in FIG. 24c. Subsequently, FIG. 24d shows the imposition of valid nuclei, $R_{min}$ and $R_{max}$ together on FIG. 2a to enclose clearly potential cytoplasmic region of each cell.

Cytoplasm Detection

After defining $R_{min}$ and $R_{max}$ with the two dotted lines in FIG. 23 for each cell, the support region of proposed local filter can be thought of as the union of N line segments $\overline{Q_jQ_j^I}$, which represent cytoplasmic width radiating from the cell center P on each orientation in FIG. 23. Additionally, the definition of the convergence index of the gradient vector is almost the same as the sliding band filter, but some constraints about variable distance $r_j$ between the cell center P and outer boundary of support region on each orientation is different.

The output of proposed local filter applying to the pixel of interest P whose Cartesian coordinate is (x,y) is defined as the average of convergence indices on N line segments $\overline{Q_jQ_j^I}$ and denoted as in 2-D discrete space, $$\text{Filter}(x, y) = \frac{1}{N}\sum_{j=0}^{N-1} \text{Filter}_j(x, y)$$

$$\text{Filter}_j(x, y) = \frac{1}{r_j - R_{min}^j} \max_{R_{min}^j < r_j \le R_{max}^j} \sum_{i=R_{min}^j+1}^{r_j} \cos\theta_i^j$$

$$\cos\theta_i^j = \cos(\theta_j - \phi(i, \theta_j))$$

$$\theta_j = \frac{1}{N}2\pi j, \text{ where } j = 0, 1, 2 \ldots, (N-1)$$

$$\phi(i, \theta_j) = \tan^{-1}\left(\frac{G_y(i, \theta_j)}{G_x(i, \theta_j)}\right),$$

where N is the number of half-lines radiating from the pixel of interest P. $\text{Filter}_j(x, y)$ is the average of the convergence indices on $j^{th}$ line segments $\overline{Q_jQ_j^I}$. $R_{min}^j$ and $R_{max}^j$ are the minimum and maximum distance from the pixel of interest P to the inner and outer boundaries on the $j^{th}$ half-line $L_j$, respectively. $\cos\theta_i^j$ is the convergence index of the gradient vector $G(Q_j')=G(i, \theta_j)$, at pixel $Q_j'$ whose polar coordinate is (i, $\theta_j$) with distance of i from P on the $j^{th}$ half-line $L_j$, $\theta_j$ is the orientation of the $j^{th}$ half-line with respect to the x-coordinate in Cartesian coordinate system. $\phi(i,\theta_j)$ is the orientation of the gradient vector $G(Q_j')=G(i, Q_j)$ at the pixel $Q_j'$ whose polar coordinate is (i, $\theta_j$), $G_x(i, \theta_j)$ and $G_y(i, \theta_j)$ are first derivative at the pixel $Q_j'$; whose polar coordinate is (i, $\theta_j$) in the horizontal and the vertical direction, respectively.

Figure 25:
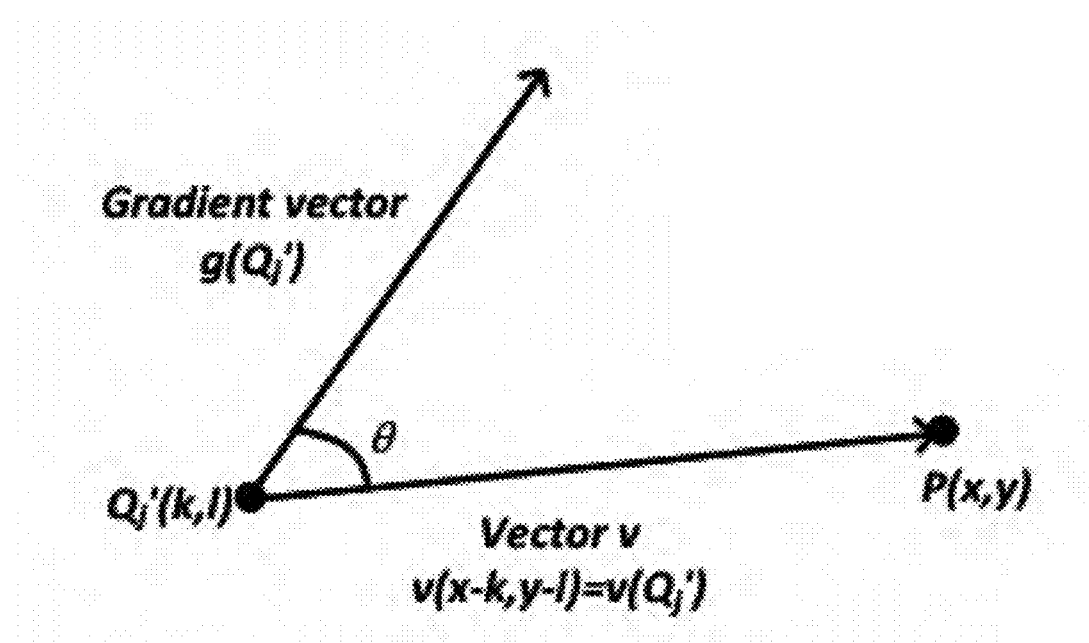
FIG. 25 shows a geometric interpretation of the angle between gradient vectors $g(Q_j')$ and $v(Q_j')$.

FIG. 25 is a geometric interpretation of the angle between gradient vectors $g(Q_j')$ and $v(Q_j')$. According to the assumptions listed before, each cytoplasm and its corresponding nucleus are almost concentric and the shape of cells and also their corresponding nuclei are all convex regions, support region which reflects the characterization of cytoplasm is deformable adaptively to the distribution of the gradient vectors, such that the average degree of convergence of the gradient vectors in it becomes maximum. To calculate $\cos\theta_i^j$, we use the concept of inner product that is defined as:

$$\cos\theta_i^j = \frac{g(Q_j') \cdot v(Q_j')}{\|g(Q_j')\|\|v(Q_j')\|},$$

where $v(Q_j')$ is a vector $\overline{Q_j'P}$ pointing from point $Q_j'$ to point P. The symbol ∥ represents the norm of vectors.

Additionally, when evaluating the average of the convergence indices $\text{Filter}_j(x, y)$ on each orientation, we only consider each convergence index of the gradient vector $\cos\theta_i^j$ larger than predefined threshold since $\cos\theta_i^j$ with small value is discredited that might be contaminated by irrelevant noise and should be ignored to enhance the accuracy of cytoplasm segmentation according to the experimental results.

The solution to the above optimization problem of proposed local filter is the set of Qj and $Q_j'$; on each half-line $L_j$ composing inner and outer boundary of segmented cytoplasm, respectively. The grey region shown in FIG. 26 is the segmented cytoplasm of that cell. Proposed local filter using the distribution of gradient vectors instead of intensity and considering local structures and adaptive constraints of each cell make it become a powerful tool for cytoplasm segmentation for multivariate biomedical images.

Figure 26A:
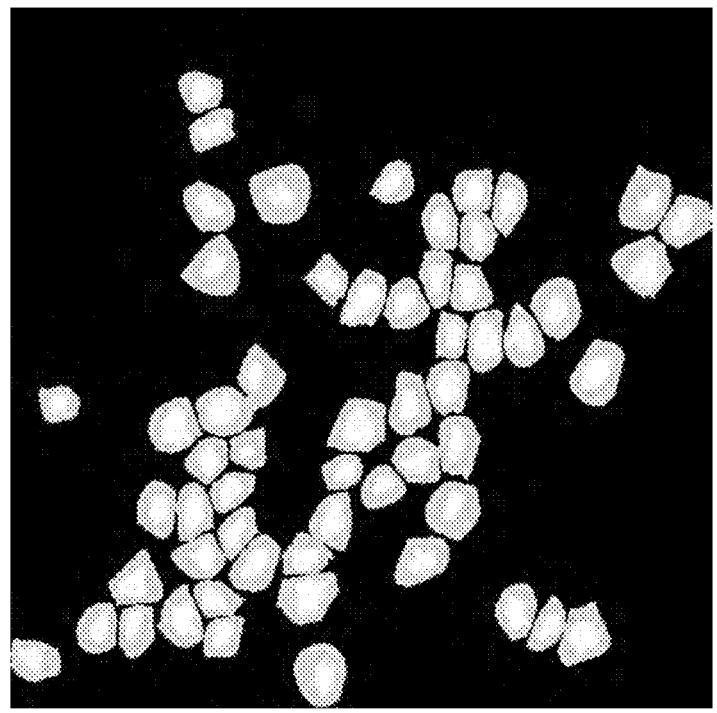
FIG. 26a shows the segmented cells.
Figure 26B:
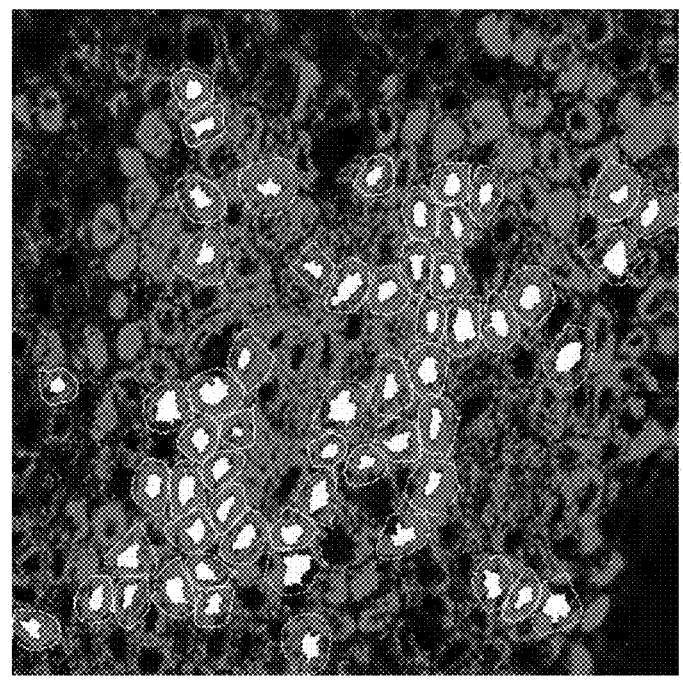
FIG. 26b shows a delineation of the segmented cells on the original image.

FIG. 26 is results of cytoplasm segmentation, including: (FIG. 26a) segmented cells, (FIG. 26b) delineation of segmented cells on the original image. FIG. 26a shows segmented cells of FIG. 2a including white segmented nuclei and their corresponding grey cytoplasm. FIG. 26b shows the delineation of segmented cells on the original image. To make it convenient to obtain profile of each segmented cell, each labeled segmented cell has its profile recorded in the spreadsheet, which will be described below.

Experimental Results

Automatic cell segmentation and NC ratio evaluation are both performed on about 600 THG virtual biopsy images on the Stratum Basale (SB) layer of human forearm skin from 31 healthy volunteers using the proposed algorithm. Each individual cell can be isolated and segmented with the proposed algorithm, and its evaluated NC ratios and cell size are also discussed and interpreted with medical doctors including dermatologist and radiologist to make this work more robust and have useful medical values in clinical diagnosis.

Figure 27A:
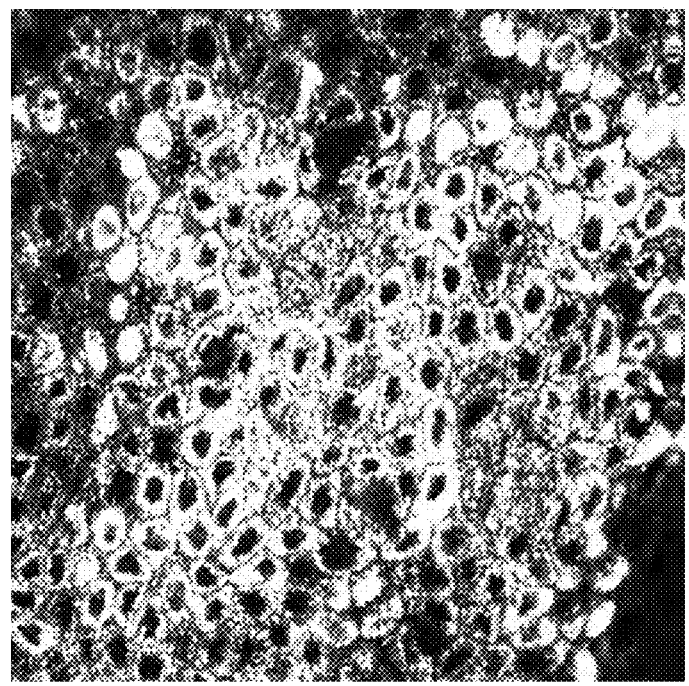
FIG. 27a shows an original image.
Figure 27B:
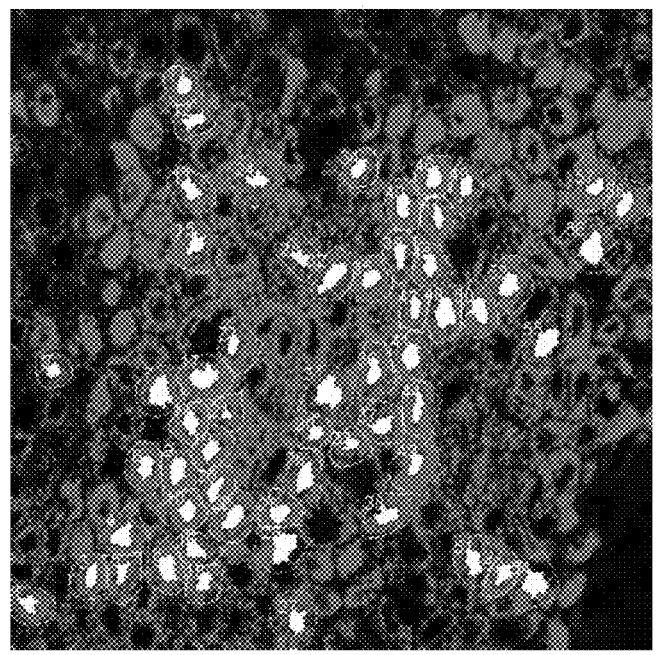
FIG. 27b shows a labeled delineation of the segmented cells on the original image.

FIG. 27 is the results of cell segmentation, including: (FIG. 27a) original image, (FIG. 27b) labeled delineation of segmented cells on the original image. Table 1 is a profile of each segmented cell in FIG. 27.

TABLE 1

| | | Profile of each segmented cell in FIG. 27 | | | |
|---|---|---|---|---|---|
| Cell Index | Cell area (pixel) | Nucleus area (pixel) | Cytoplasmic area (pixel) | NC ratio | Position (row, column) |
| 1 | 924 | 229 | 695 | 0.329496403 | (476, 16) |
| 2 | 649 | 160 | 489 | 0.327198364 | (289, 36) |
| 3 | 901 | 228 | 673 | 0.338781575 | (453, 66) |
| 4 | 1076 | 316 | 760 | 0.415789474 | (422, 91) |
| 5 | 836 | 201 | 635 | 0.316535433 | (451, 91) |
| 6 | 949 | 246 | 703 | 0.349928876 | (366, 109) |
| 7 | 1153 | 429 | 724 | 0.592541436 | (307, 121) |
| 8 | 1043 | 332 | 711 | 0.466947961 | (447, 127) |
| 9 | 909 | 334 | 575 | 0.580869565 | (369, 134) |
| 10 | 910 | 257 | 653 | 0.393568147 | (402, 143) |
| 11 | 760 | 214 | 546 | 0.391941392 | (62, 140) |
| 12 | 761 | 236 | 525 | 0.44952381 | (90, 148) |
| 13 | 1027 | 248 | 779 | 0.318356868 | (146, 145) |
| 14 | 769 | 242 | 527 | 0.459203036 | (331, 145) |
| 15 | 1315 | 246 | 1069 | 0.230121609 | (189, 149) |
| 16 | 713 | 231 | 482 | 0.479253112 | (433, 149) |
| 17 | 1196 | 415 | 781 | 0.531370038 | (295, 156) |
| 18 | 745 | 216 | 529 | 0.40831758 | (458, 156) |
| 19 | 706 | 246 | 460 | 0.534782609 | (353, 161) |
| 20 | 737 | 228 | 509 | 0.447937132 | (384, 164) |
| 21 | 643 | 85 | 558 | 0.152329749 | (325, 173) |
| 22 | 1082 | 309 | 773 | 0.399741268 | (407, 179) |
| 23 | 1044 | 168 | 876 | 0.191780822 | (269, 179) |
| 24 | 1546 | 243 | 1303 | 0.186492709 | (138, 198) |
| 25 | 812 | 258 | 554 | 0.465703971 | (403, 215) |
| 26 | 1278 | 466 | 812 | 0.573891626 | (430, 219) |
| 27 | 1395 | 292 | 1103 | 0.264732548 | (490, 230) |
| 28 | 734 | 193 | 541 | 0.356746765 | (200, 233) |
| 29 | 996 | 337 | 659 | 0.51138088 | (375, 236) |
| 30 | 607 | 184 | 423 | 0.43498818 | (340, 245) |
| 31 | 1298 | 486 | 812 | 0.598522167 | (307, 255) |
| 32 | 1010 | 404 | 606 | 0.666666667 | (215, 258) |
| 33 | 762 | 155 | 607 | 0.255354201 | (348, 273) |
| 34 | 722 | 208 | 514 | 0.404669261 | (129, 279) |
| 35 | 909 | 234 | 675 | 0.346666667 | (217, 288) |
| 36 | 1087 | 240 | 847 | 0.283353011 | (291, 291) |
| 37 | 946 | 281 | 665 | 0.422556391 | (333, 297) |
| 38 | 1093 | 278 | 815 | 0.341104294 | (405, 301) |
| 39 | 808 | 220 | 588 | 0.37414966 | (198, 312) |
| 40 | 862 | 253 | 609 | 0.41543514 | (158, 314) |
| 41 | 995 | 330 | 665 | 0.496240602 | (278, 320) |
| 42 | 1311 | 221 | 1090 | 0.202752294 | (364, 324) |
| 43 | 646 | 198 | 448 | 0.441964286 | (240, 323) |
| 44 | 1108 | 244 | 864 | 0.282407407 | (319, 326) |
| 45 | 839 | 251 | 588 | 0.426870748 | (205, 335) |
| 46 | 811 | 244 | 567 | 0.430335097 | (136, 339) |
| 47 | 786 | 199 | 587 | 0.339011925 | (167, 342) |
| 48 | 1008 | 420 | 588 | 0.714285714 | (244, 348) |
| 49 | 862 | 222 | 640 | 0.346875 | (143, 364) |
| 50 | 972 | 319 | 653 | 0.488514548 | (242, 374) |
| 51 | 943 | 296 | 647 | 0.457496136 | (442, 370) |
| 52 | 722 | 217 | 505 | 0.42970297 | (452, 394) |
| 53 | 1226 | 303 | 923 | 0.328277356 | (222, 398) |
| 54 | 1221 | 408 | 813 | 0.501845018 | (460, 419) |
| 55 | 1357 | 400 | 957 | 0.417972832 | (267, 428) |
| 56 | 1341 | 452 | 889 | 0.508436445 | (193, 464) |
| 57 | 1323 | 195 | 1128 | 0.17287234 | (143, 467) |
| 58 | 1066 | 265 | 801 | 0.330836454 | (157, 490) |
| Total | 56250 | 15732 | 40518 | — | — |
| Average | 969.8276 (pixels) | 271.2414 (pixels) | 698.5862 (pixels) | 0.388271879 | — |
| Average | 53.2742 (μm2) | 14.8997 (μm2) | 38.3745 (μm2) | — | — |

Figure 28A:
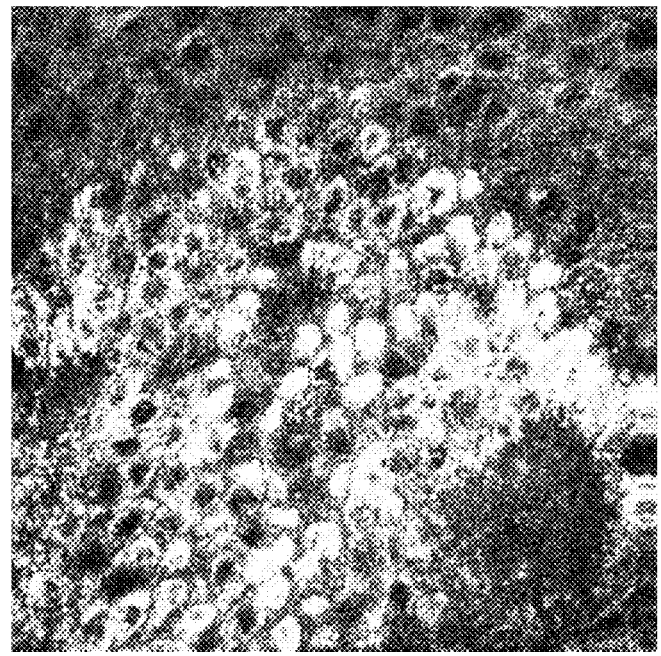
FIG. 28a shows an original image.
Figure 28B:
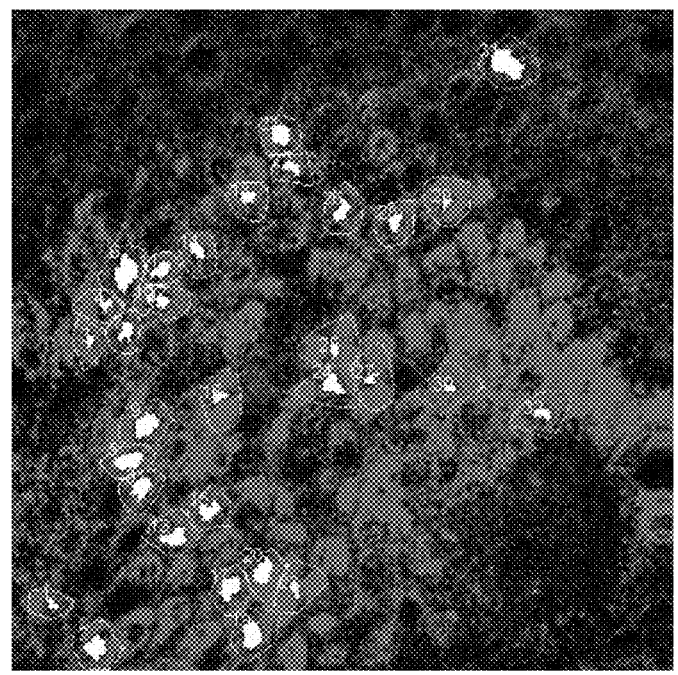
FIG. 28b shows a labeled delineation of the segmented cells on the original image.

FIG. 28 is the results of cell segmentation, including: (FIG. 28*a*) original image, (FIG. 28*b*) labeled delineation of segmented cells on the original image. Table 2 is a profile of each segmented cell in FIG. 28.

TABLE 2

Profile of each segmented cell in FIG. 4-28

| Cell Index | Cell area (pixel) | Nucleus area (pixel) | Cytoplasmic area (pixel) | NC ratio | Position (row, column) |
|---|---|---|---|---|---|
| 1 | 610 | 99 | 511 | 0.193738 | (461, 33) |
| 2 | 1076 | 316 | 760 | 0.415789 | (495, 66) |
| 3 | 681 | 85 | 596 | 0.142617 | (258, 61) |
| 4 | 718 | 106 | 612 | 0.173203 | (230, 74) |
| 5 | 758 | 321 | 437 | 0.734554 | (350, 92) |
| 6 | 1148 | 452 | 696 | 0.649425 | (205, 89) |
| 7 | 664 | 187 | 477 | 0.392034 | (251, 90) |
| 8 | 813 | 276 | 537 | 0.513966 | (371, 101) |
| 9 | 1084 | 335 | 749 | 0.447263 | (323, 105) |
| 10 | 240 | 63 | 177 | 0.355932 | (225, 107) |
| 11 | 583 | 204 | 379 | 0.538259 | (203, 117) |
| 12 | 606 | 135 | 471 | 0.286624 | (227, 117) |
| 13 | 1005 | 283 | 722 | 0.391967 | (410, 127) |
| 14 | 837 | 157 | 680 | 0.230882 | (187, 145) |
| 15 | 814 | 237 | 577 | 0.410745 | (389, 154) |
| 16 | 1181 | 121 | 1060 | 0.114151 | (301, 161) |
| 17 | 837 | 284 | 553 | 0.513562 | (449, 170) |
| 18 | 782 | 139 | 643 | 0.216174 | (147, 184) |
| 19 | 1119 | 344 | 775 | 0.443871 | (485, 187) |
| 20 | 850 | 290 | 560 | 0.517857 | (436, 195) |
| 21 | 797 | 268 | 529 | 0.506616 | (98, 209) |
| 22 | 617 | 157 | 460 | 0.341304 | (124, 217) |
| 23 | 1069 | 103 | 966 | 0.106625 | (450, 220) |
| 24 | 1110 | 246 | 864 | 0.284722 | (292, 249) |
| 25 | 1280 | 99 | 1181 | 0.083827 | (265, 251) |
| 26 | 934 | 201 | 733 | 0.274216 | (158, 256) |
| 27 | 1202 | 109 | 1093 | 0.099726 | (286, 279) |
| 28 | 858 | 169 | 689 | 0.245283 | (166, 297) |
| 29 | 1099 | 96 | 1003 | 0.095713 | (151, 337) |
| 30 | 1151 | 78 | 1073 | 0.072693 | (294, 339) |
| 31 | 1369 | 508 | 861 | 0.590012 | (44, 384) |
| 32 | 1126 | 148 | 978 | 0.151329 | (314, 411) |
| Total | 29018 | 6616 | 22402 | — | — |
| Average | 906.8125 (pixels) | 206.75 (pixels) | 700.0625 (pixels) | 0.295330774 | — |
| Average | 49.8127 (μm2) | 11.3571 (μm2) | 38.4556 (μm2) | — | — |

Figure 29A:
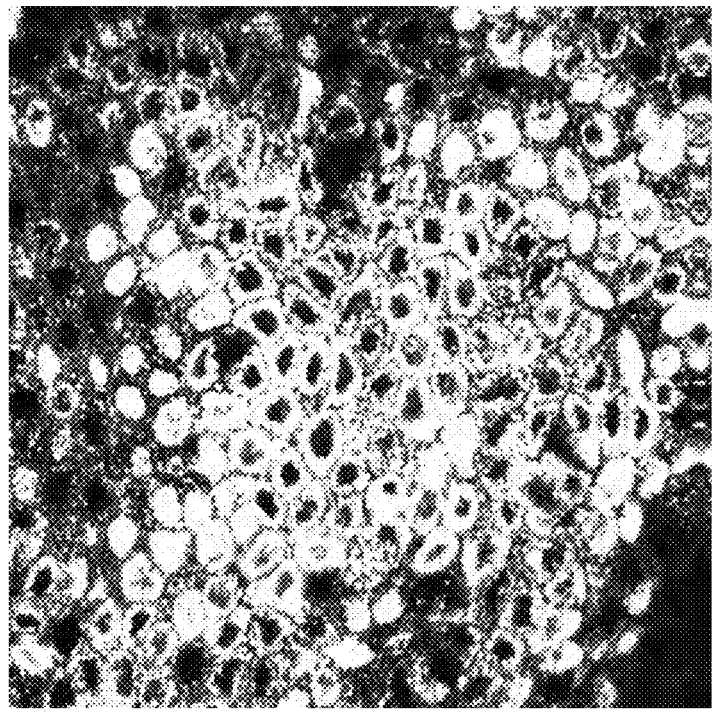
FIG. 29a shows an original image.
Figure 29B:
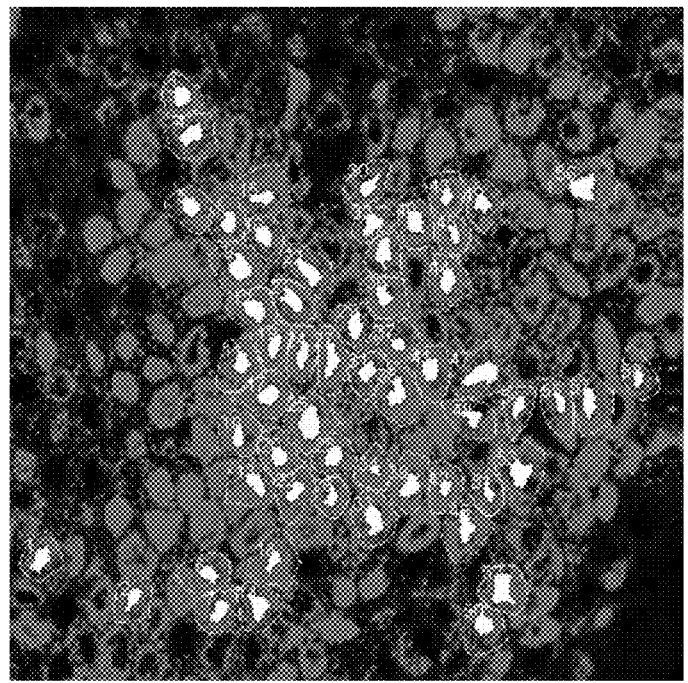
FIG. 29b shows a labeled delineation of the segmented cells on the original image.

FIG. 29 is the results of cell segmentation, including: (FIG. 29*a*) original image, (FIG. 29*b*) labeled delineation of segmented cells on the original image. Table 3 is profile of each segmented cell in FIG. 29.

TABLE 3

Profile of each segmented cell in FIG. 29

| Cell Index | Cell area (pixel) | Nucleus area (pixel) | Cytoplasmic area (pixel) | NC ratio | Position (row, column) |
|---|---|---|---|---|---|
| 1 | 834 | 265 | 569 | 0.4657294 | (420, 25) |
| 2 | 815 | 199 | 616 | 0.3230519 | (450, 95) |
| 3 | 755 | 213 | 542 | 0.3929889 | (69, 132) |
| 4 | 1074 | 275 | 799 | 0.3441802 | (98, 140) |
| 5 | 864 | 214 | 650 | 0.3292308 | (153, 139) |
| 6 | 957 | 186 | 771 | 0.2412451 | (432, 153) |
| 7 | 829 | 234 | 595 | 0.3932773 | (459, 161) |
| 8 | 721 | 213 | 508 | 0.4192913 | (165, 168) |
| 9 | 1163 | 333 | 830 | 0.4012048 | (199, 176) |
| 10 | 959 | 168 | 791 | 0.2123894 | (327, 175) |
| 11 | 1018 | 211 | 807 | 0.2614622 | (271, 177) |
| 12 | 988 | 289 | 699 | 0.4134478 | (231, 187) |
| 13 | 1084 | 249 | 835 | 0.2982036 | (363, 189) |
| 14 | 984 | 288 | 696 | 0.4137931 | (456, 190) |
| 15 | 1235 | 207 | 1028 | 0.2013619 | (146, 193) |

TABLE 3-continued

Profile of each segmented cell in FIG. 29

| Cell Index | Cell area (pixel) | Nucleus area (pixel) | Cytoplasmic area (pixel) | NC ratio | Position (row, column) |
|---|---|---|---|---|---|
| 16 | 756 | 228 | 528 | 0.4318182 | (175, 194) |
| 17 | 1011 | 253 | 758 | 0.3337731 | (296, 197) |
| 18 | 1222 | 177 | 1045 | 0.169378 | (422, 201) |
| 19 | 679 | 197 | 482 | 0.4087137 | (259, 202) |
| 20 | 866 | 209 | 657 | 0.3181126 | (342, 205) |
| 21 | 852 | 266 | 586 | 0.4539249 | (224, 216) |
| 22 | 820 | 204 | 616 | 0.3311688 | (369, 218) |
| 23 | 964 | 327 | 637 | 0.5133438 | (202, 228) |
| 24 | 788 | 209 | 579 | 0.3609672 | (266, 223) |
| 25 | 1231 | 398 | 833 | 0.4777911 | (317, 229) |
| 26 | 636 | 161 | 475 | 0.3389474 | (373, 246) |
| 27 | 954 | 281 | 673 | 0.4175334 | (269, 245) |
| 28 | 783 | 230 | 553 | 0.4159132 | (342, 247) |
| 29 | 739 | 252 | 487 | 0.5174538 | (244, 263) |
| 30 | 863 | 213 | 650 | 0.3276923 | (137, 274) |
| 31 | 701 | 212 | 489 | 0.4335378 | (278, 273) |
| 32 | 655 | 251 | 404 | 0.6212871 | (166, 276) |
| 33 | 1102 | 318 | 784 | 0.4056122 | (391, 277) |
| 34 | 700 | 88 | 612 | 0.1437909 | (352, 279) |
| 35 | 762 | 287 | 475 | 0.6042105 | (187, 285) |
| 36 | 881 | 214 | 667 | 0.3208396 | (220, 285) |
| 37 | 767 | 158 | 609 | 0.2594417 | (257, 295) |
| 38 | 1203 | 294 | 909 | 0.3234323 | (294, 295) |
| 39 | 1135 | 255 | 880 | 0.2897727 | (365, 305) |
| 40 | 828 | 245 | 583 | 0.4202401 | (165, 309) |
| 41 | 952 | 241 | 711 | 0.3389592 | (276, 320) |
| 42 | 788 | 134 | 654 | 0.204893 | (366, 332) |
| 43 | 789 | 148 | 641 | 0.2308892 | (145, 333) |
| 44 | 977 | 238 | 739 | 0.3220568 | (209, 334) |
| 45 | 630 | 147 | 483 | 0.3043478 | (174, 338) |
| 46 | 1213 | 276 | 937 | 0.2945571 | (396, 347) |
| 47 | 1262 | 428 | 834 | 0.5131894 | (280, 359) |
| 48 | 958 | 191 | 767 | 0.2490222 | (313, 352) |
| 49 | 783 | 204 | 579 | 0.3523316 | (151, 360) |
| 50 | 978 | 244 | 734 | 0.3324251 | (470, 361) |
| 51 | 615 | 147 | 468 | 0.3141026 | (370, 364) |
| 52 | 1052 | 373 | 679 | 0.5493373 | (443, 375) |
| 53 | 1346 | 349 | 997 | 0.3500502 | (355, 388) |
| 54 | 682 | 169 | 513 | 0.3294347 | (304, 387) |
| 55 | 839 | 170 | 669 | 0.2541106 | (301, 419) |
| 56 | 1664 | 406 | 1258 | 0.3227345 | (138, 436) |
| 57 | 1159 | 260 | 899 | 0.2892102 | (301, 440) |
| 58 | 785 | 134 | 651 | 0.2058372 | (283, 478) |
| Total | 53650 | 13730 | 39920 | — | — |
| Average | 925 (pixels) | 236.7241 (pixels) | 688.2759 (pixels) | 0.343938 | — |
| Average | 50.8118 (µm2) | 13.0036 (µm2) | 37.8081 (µm2) | — | — |

Figure 30A:
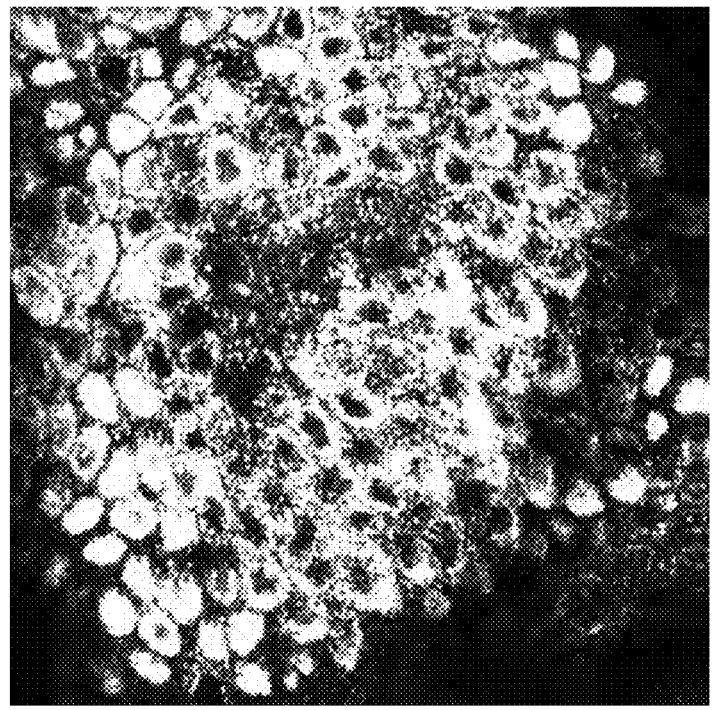
FIG. 30a shows an original image.
Figure 30B:
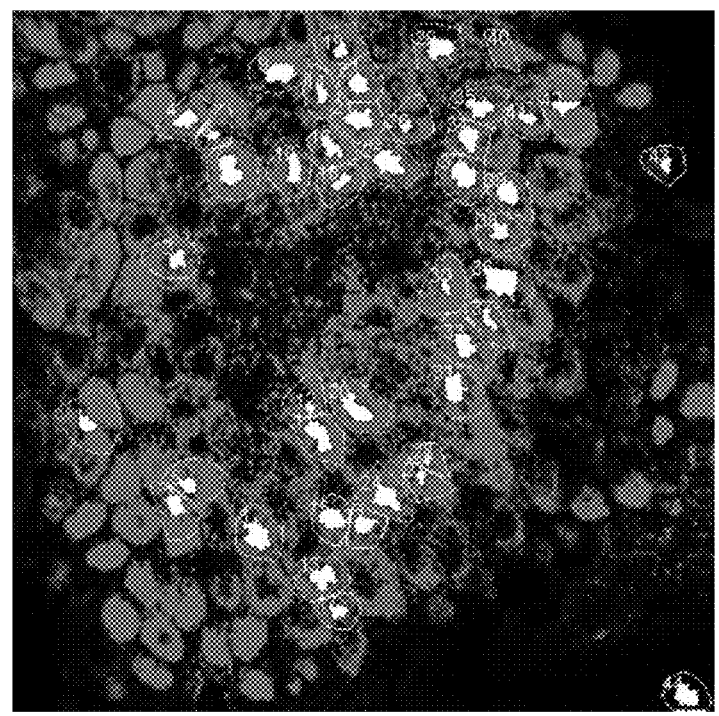
FIG. 30b shows a labeled delineation of the segmented cells on the original image.

FIG. 30 is the results of cell segmentation, including: (FIG. 30a) original image, (FIG. 30b) labeled delineation of segmented cells on the original image. Table 4 is a profile of each segmented cell in FIG. 30.

TABLE 4

Profile of each segmented cell in FIG. 30

| Cell Index | Cell area (pixel) | Nucleus area (pixel) | Cytoplasmic area (pixel) | NC ratio | Position (row, column) |
|---|---|---|---|---|---|
| 1 | 1539 | 162 | 1377 | 0.1176471 | (303, 56) |
| 2 | 924 | 208 | 716 | 0.2905028 | (362, 120) |
| 3 | 942 | 204 | 738 | 0.2764228 | (183, 122) |
| 4 | 899 | 229 | 670 | 0.341791 | (81, 128) |
| 5 | 1040 | 171 | 869 | 0.1967779 | (347, 129) |
| 6 | 591 | 88 | 503 | 0.1749503 | (92, 148) |
| 7 | 1344 | 366 | 978 | 0.3742331 | (118, 159) |
| 8 | 1068 | 388 | 680 | 0.5705882 | (384, 179) |
| 9 | 1138 | 316 | 822 | 0.3844282 | (47, 196) |
| 10 | 930 | 263 | 667 | 0.3943028 | (117, 206) |

TABLE 4-continued

Profile of each segmented cell in FIG. 30

| Cell Index | Cell area (pixel) | Nucleus area (pixel) | Cytoplasmic area (pixel) | NC ratio | Position (row, column) |
|---|---|---|---|---|---|
| 11 | 972 | 340 | 632 | 0.5379747 | (311, 224) |
| 12 | 740 | 82 | 658 | 0.1246201 | (291, 218) |
| 13 | 945 | 333 | 612 | 0.5441176 | (415, 228) |
| 14 | 693 | 141 | 552 | 0.2554348 | (62, 226) |
| 15 | 797 | 307 | 490 | 0.6265306 | (372, 234) |
| 16 | 811 | 228 | 583 | 0.3910806 | (101, 234) |
| 17 | 654 | 177 | 477 | 0.3710692 | (440, 239) |
| 18 | 812 | 158 | 654 | 0.2415902 | (126, 241) |
| 19 | 963 | 136 | 827 | 0.1644498 | (31, 240) |
| 20 | 1269 | 341 | 928 | 0.3674569 | (292, 252) |
| 21 | 884 | 301 | 583 | 0.516295 | (80, 254) |
| 22 | 787 | 246 | 541 | 0.4547135 | (55, 253) |
| 23 | 657 | 211 | 446 | 0.4730942 | (377, 257) |
| 24 | 1144 | 346 | 798 | 0.433584 | (357, 274) |
| 25 | 1101 | 388 | 713 | 0.5441795 | (113, 275) |
| 26 | 850 | 97 | 753 | 0.1288181 | (86, 288) |
| 27 | 602 | 95 | 507 | 0.1873767 | (341, 299) |
| 28 | 428 | 82 | 346 | 0.2369942 | (329, 304) |
| 29 | 1142 | 320 | 822 | 0.3892944 | (29, 313) |
| 30 | 1144 | 103 | 1041 | 0.0989433 | (202, 317) |
| 31 | 1200 | 323 | 877 | 0.368301 | (277, 323) |
| 32 | 1048 | 351 | 697 | 0.5035868 | (121, 330) |
| 33 | 1255 | 297 | 958 | 0.3100209 | (246, 330) |
| 34 | 737 | 284 | 453 | 0.6269316 | (95, 333) |
| 35 | 879 | 281 | 598 | 0.4698997 | (72, 342) |
| 36 | 1487 | 500 | 987 | 0.5065856 | (199, 357) |
| 37 | 717 | 166 | 551 | 0.3012704 | (227, 348) |
| 38 | 886 | 206 | 680 | 0.3029412 | (162, 356) |
| 39 | 825 | 270 | 555 | 0.4864865 | (134, 362) |
| 40 | 492 | 9 | 483 | 0.0186335 | (22, 356) |
| 41 | 676 | 140 | 536 | 0.261194 | (80, 376) |
| 42 | 1501 | 209 | 1292 | 0.1617647 | (71, 403) |
| 43 | 684 | 118 | 566 | 0.2084806 | (114, 477) |
| 44 | 749 | 306 | 443 | 0.6907449 | (501, 492) |
| Total | 40946 | 10287 | 30659 | — | — |
| Average | 930.5909 (pixels) | 233.7955 (pixels) | 696.7955 (pixels) | 0.3355295 | — |
| Average | 51.1189 (μm2) | 12.8428 (μm2) | 38.2761 (μm2) | — | — |

Figure 31A:
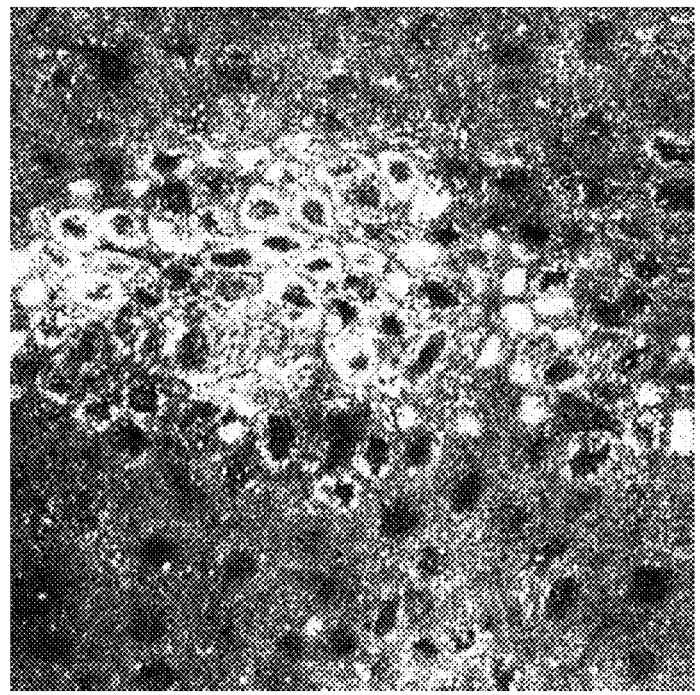
FIG. 31a shows an original image.
Figure 31B:
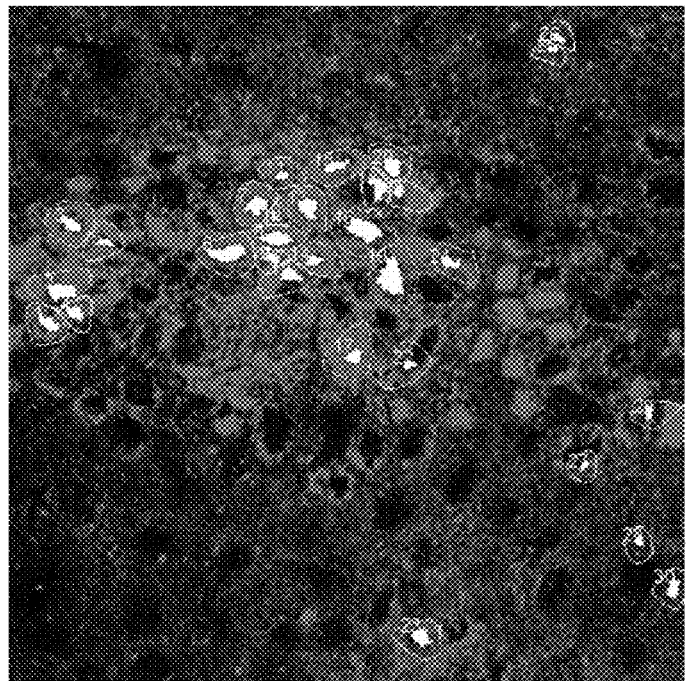
FIG. 31b shows a labeled delineation of the segmented cells on the original image.

FIG. 31 is results of cell segmentation, including: (FIG. 31a) original image, (FIG. 31b) labeled delineation of segmented cells on the original image. Table 5 is profile of each segmented cell in FIG. 31.

TABLE 5

Profile of each segmented cell in FIG. 31

| Cell Index | Cell area (pixel) | Nucleus area (pixel) | Cytoplasmic area (pixel) | NC ratio | Position (row, column) |
|---|---|---|---|---|---|
| 1 | 740 | 194 | 546 | 0.3553114 | (242, 31) |
| 2 | 1000 | 270 | 730 | 0.369863 | (217, 41) |
| 3 | 966 | 169 | 797 | 0.2120452 | (166, 48) |
| 4 | 484 | 156 | 328 | 0.4756098 | (234, 52) |
| 5 | 635 | 97 | 538 | 0.1802974 | (181, 74) |
| 6 | 1053 | 347 | 706 | 0.4915014 | (189, 167) |
| 7 | 813 | 232 | 581 | 0.3993115 | (152, 188) |
| 8 | 656 | 260 | 396 | 0.6565657 | (178, 203) |
| 9 | 341 | 117 | 224 | 0.5223214 | (192, 201) |
| 10 | 218 | 60 | 158 | 0.3797468 | (161, 203) |
| 11 | 602 | 94 | 508 | 0.1850394 | (129, 208) |
| 12 | 735 | 177 | 558 | 0.3172043 | (205, 214) |
| 13 | 836 | 250 | 586 | 0.4266212 | (154, 228) |
| 14 | 699 | 138 | 561 | 0.2459893 | (194, 231) |
| 15 | 848 | 161 | 687 | 0.2343523 | (123, 249) |
| 16 | 1301 | 408 | 893 | 0.4568869 | (171, 270) |
| 17 | 1114 | 158 | 956 | 0.165272 | (266, 262) |
| 18 | 571 | 223 | 348 | 0.6408046 | (139, 281) |
| 19 | 1389 | 490 | 899 | 0.5450501 | (207, 290) |

TABLE 5-continued

Profile of each segmented cell in FIG. 31

| Cell Index | Cell area (pixel) | Nucleus area (pixel) | Cytoplasmic area (pixel) | NC ratio | Position (row, column) |
|---|---|---|---|---|---|
| 20 | 664 | 209 | 455 | 0.4593407 | (123, 291) |
| 21 | 539 | 96 | 443 | 0.2167043 | (141, 296) |
| 22 | 975 | 96 | 879 | 0.109215 | (273, 304) |
| 23 | 789 | 214 | 575 | 0.3721739 | (480, 313) |
| 24 | 733 | 160 | 573 | 0.2792321 | (195, 335) |
| 25 | 307 | 54 | 253 | 0.2134387 | (34, 412) |
| 26 | 375 | 83 | 292 | 0.2842466 | (26, 417) |
| 27 | 394 | 66 | 328 | 0.2012195 | (349, 436) |
| 28 | 456 | 70 | 386 | 0.1813472 | (407, 477) |
| 29 | 584 | 89 | 495 | 0.179798 | (310, 485) |
| 30 | 527 | 168 | 359 | 0.4679666 | (443, 504) |
| Total | 21344 | 5306 | 16038 | — | — |
| Average | 711.4667 (pixels) | 176.8667 (pixels) | 534.6 (pixels) | 0.3308393 | — |
| Average | 39.082 ($\mu m^2$) | 9.7156 ($\mu m^2$) | 29.3665 ($\mu m^2$) | — | — |

FIGS. 27 to 31 illustrate several experimental results of cell segmentation and their profiles including evaluated NC ratios and also the information of cell size and their position are illustrated in Table 1 to Table 5, respectively. From the experimental results, most of cells are segmented accurately and only few cells are segmented mistakenly. User interaction can be adopted for medical doctors or medical staff to exclude mistaken cells with the profiles which record the information of each segmented cell or select specific cells of interest to enhance the performance of cell segmentation and NC ratio evaluation in clinical diagnosis.

Table 6 is a comparison of NC ratio analysis.

TABLE 6

Comparison of NC ratio analysis

| Items | | Proposed method | Paper |
|---|---|---|---|
| NC ratios | Mean ($\mu$) | 0.328 | 0.349 |
| | Standard deviation ($\sigma$) | 0.023 | 0.017 |
| | Range | 0.29-0.38 | 0.33-0.35 |
| | Cell segmentation | Automatic | Manual |
| | Processing time | 5-15 seconds per image | Several minutes per image |
| | Dataset | The same THG images | |

Table 6 illustrates the comparison of NC ratio analysis with others work. The same database of THG images are analyzed in both proposed work and the paper S.-Y. Chen, S.-U. Chen, H.-Y. Wu, W.-J. Lee, Y.-H. Liao, and C.-K. Sun, In vivo virtual biopsy of human skin by using noninvasive higher harmonic generation microscopy, IEEE Journal of Selected Topics in Quantum Electronics, vol. 16, no. 3, pp. 478-492, 2010, and the main different part between these two works is that the proposed work processes and analyzes biomedical images automatically, but the paper uses manual hand selecting for cell segmentation followed by NC ratio analysis.

From the statistical distribution of the evaluated NC ratios shown in Table 6, evaluated NC ratios using proposed algorithm are very close to the paper. The current algorithm of the proposed cell segmentation method is based on PC-platform and processing time can be used to roughly measure the complexity of the proposed algorithm. By some experimental results, the processing time for one 12-bit image whose resolution is 512×512 is about 5 to 15 seconds to complete automatic cell segmentation and their profile evaluation. However, the conventional analysis such as the paper may take several minutes to complete the cell segmentation and analysis works for each 12-bit 512×512 image.

The proposed computer-aided design of cell segmentation not only speeds up the analysis of medical images up but also has objective segmentation results with consistent accuracy. On the contrary, the conventional cell segmentation method by manually hand selection takes several minutes to segment and analyze one image and may suffer from fatigue of human eyes and subjective judgments by medical staff resulting in poor or unconvinced segmented or analyzed results. The proposed work indeed saves much time and has convinced results with medical doctors interpretation and discussion, which has significant potential for biomedical imaging analysis. For example, it can assist medical doctors to noninvasively identify early symptoms of diseases with abnormal NC ratios and also can quantify skin aging or assess effects of skin brightening products. In addition, the cell image segmentation method of the disclosure may be executed by a processor of a computer system along with a necessary database described above.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A cell image segmentation method, as performed by a processor of a computer system, comprising:
   receiving a cell image;
   performing a nuclei initialization step to find an internal marker and an external marker to obtain a potential nuclei and a potential cell boundary corresponding to the potential nuclei;
   calculating a gradient map of the received cell image;
   performing a filtering step on the gradient map to generate a filtered gradient map according to the potential nuclei and the potential cell boundary;
   performing a nuclei detection step by calculating watersheds of the filtered gradient map to obtain a segmented nuclei;
   performing a nuclei validation step by preserving a part of the segmented nuclei with relatively higher compactness and excluding another part of the segmented nuclei with relatively lower compactness to obtain a valid nuclei, wherein the nuclei initialization step comprises:
performing a blob detection step to obtain a nuclei candidate;
performing an outlier removal step to exclude an outlier of the nuclei candidate to obtain the internal marker;
performing a distance transform step of the internal marker to obtain a distance map; and
performing a cell boundary initialization step to obtain the external marker from the distance map.

2. The cell image segmentation method of claim 1, wherein the blob detection step comprises spanning the received cell image into a scale-space to interpret a multi-scale representation of the received cell image at various scales.

3. The cell image segmentation method of claim 2, wherein the blob detection step further comprises a super-imposition step to calculate average scale information at various scales to obtain the nuclei candidate.

4. The cell image segmentation method of claim 1, wherein the distance transform step comprises calculating an Euclidean distance of the internal marker to obtain the distance map.

5. The cell image segmentation method of claim 4, wherein the cell boundary initialization step comprises performing a watershed transformation on the distance map to obtain the external marker.

6. The cell image segmentation method of claim 1, wherein the filtering step comprises performing a morphological minima imposition step on the gradient map according to the internal marker and the external marker.

7. The cell image segmentation method of claim 1, further comprising a cytoplasm initialization step to obtain a potential cytoplasmic region of the valid nuclei, wherein the potential cytoplasmic region has a minimum boundary and a maximum boundary, wherein the minimum boundary is a boundary of the valid nuclei, wherein the maximum boundary is obtained from the distance map of the valid nuclei, wherein the potential cytoplasmic region is outward of the minimum boundary and is inward of the maximum boundary, and wherein the method further comprises performing a watershed transformation on the distance map of the valid nuclei to obtain the maximum boundary.

8. The cell image segmentation method of claim 7, wherein the potential cytoplasmic region has a plurality of gradient vectors and a cell boundary, wherein the cell image segmentation method further comprises a cytoplasm detection step to obtain the cell boundary using the plurality of gradient vectors.

9. The cell image segmentation method of claim 1, wherein the segmented nuclei comprises a plurality of pixels, and wherein the compactness of the segmented nuclei is determined by an area and a perimeter of each of the plurality of pixels in the segmented nuclei.

10. The cell image segmentation method of claim 9, wherein the compactness of the segmented nuclei is determined by an equation of $A/P^2$, wherein A represents the area and P represents the perimeter of each of the plurality of pixels in the segmented nuclei.

11. A nuclear-to-cytoplasmic ratio evaluation method comprising:
performing the cell image segmentation method of claim 7; and
obtaining a nuclear-to-cytoplasmic ratio by calculating a nucleus area and a cytoplasmic area.

* * * * *